(12) United States Patent
Kawada et al.

(10) Patent No.: US 6,334,392 B1
(45) Date of Patent: Jan. 1, 2002

(54) DRAWING APPARATUS HAVING FIXING MEMBER FOR CLAMPING MATERIAL ON DRUM

(75) Inventors: Toru Kawada; Shiro Kitawaki; Tadaaki Tani; Arifumi Omoto; Kazuma Kan, all of Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 0 days.

(21) Appl. No.: 09/614,624

(22) Filed: Jul. 12, 2000

Related U.S. Application Data

(62) Division of application No. 09/366,839, filed on Aug. 4, 1999, now Pat. No. 6,164,204.

(30) Foreign Application Priority Data

Aug. 4, 1998 (JP) .............................................. 10-220907
Jul. 23, 1999 (JP) .............................................. 11-209170

(51) Int. Cl.⁷ .............................................. B41F 27/12
(52) U.S. Cl. .................. 101/415.1; 101/477; 101/463.1
(58) Field of Search ................................ 101/410, 477, 101/409, 415.1, 463.1, 467, 401.1

(56) References Cited

U.S. PATENT DOCUMENTS 5,335,046 A * 8/1994 Bosy ....................... 101/415.1
5,516,096 A * 5/1996 Whiteside et al. ........... 101/409
5,533,446 A * 7/1996 Hashimura et al. .......... 101/477
5,533,452 A * 7/1996 Mouri et al. ................. 101/467
5,685,226 A   11/1997 Fuller ....................... 101/415.1
6,003,442 A * 12/1999 Solomon et al. ............. 101/409

* cited by examiner

*Primary Examiner*—Leslie T. Grohusky
(74) *Attorney, Agent, or Firm*—Ostrolenk, Faber, Gerb & Soffen, LLP

(57) ABSTRACT

A recording drum has a clamp groove extending in its circumferential direction formed on its outer peripheral surface. A plurality of front end clamps are attached to the outer peripheral surface of the recording drum. Rear end clamps are attached so as to be movable and so as to be fixable along the clamp groove on the outer peripheral surface of the recording drum. A recording head is disposed ahead of the recording drum, and a clamp driving device is disposed behind the recording drum. The clamp driving device comprises a first driving device for fixing the front end clamps and fixing and releasing the rear end clamps and a second driving device for releasing the front end clamps. The front end clamps and the rear end clamps reliably fix a front end and a rear end of a plate to the outer peripheral surface of the recording drum by a reaction force produced by a spring and a centrifugal force produced by the rotation of the recording drum.

16 Claims, 31 Drawing Sheets

DRAWING APPARATUS HAVING FIXING MEMBER FOR CLAMPING MATERIAL ON DRUM

This is a divisional of application Ser. No. 09/366,839, filed Aug. 4, 1999 now U.S. Pat. No. 6,164,204.

BACKGROUND OF THE INVENTION

1. Field of the Invention

The present invention relates to a drawing apparatus for fixing a sheet-shaped recording material to an outer peripheral surface of a drum to draw an image on the recording material.

2. Description of the Background Art

Drawing apparatuses have been used for drawing images upon irradiation of various types of photosensitive materials with light. In a drum-type drawing apparatus, a photosensitive material is mounted on a recording drum which is rotatable in a primary scanning direction, and a recording head comprising a laser diode and the like moves in a secondary scanning direction parallel to a rotary shaft of the recording drum to draw an image on the photosensitive material.

FIG. 34 is a schematic perspective view of a recording drum in a conventional drawing apparatus. A plate 160 made of aluminum serving as a photosensitive material is mounted on a recording drum 150 shown in FIG. 34. A front end clamp 170 for fixing one end of the plate 160 and a rear end clamp 180 for fixing the other end of the plate 160 are attached to an outer peripheral surface of the recording drum 150. The rear end clamp 180 contains a magnet, and is fixed by a magnetic force to a position, on the outer peripheral surface of the recording drum 150, corresponding to the size of the plate 160.

The recording drum 150 having the plate 160 attached thereto is rotated at relatively low speed around a rotary shaft 190, so that an image is drawn on the surface of the plate 160.

In recent years, a request to improve the efficiency of processing for drawing an image on the plate 160 has been made. In order to improve the efficiency of the drawing processing, the recording drum 150 having the plate 160 attached thereto must be rotated at high speed.

However, the rear end clamp 180 is fixed to the recording drum 150 by the magnetic force. When the recording drum 150 is rotated at high speed, therefore, the rear end clamp 180 moves on the outer peripheral surface of the recording drum 150 or is detached from the recording drum 150, so that the plate 160 fixed to the recording drum 150 may be shifted in position and detached. Therefore, the recording drum 150 cannot be rotated at high speed.

SUMMARY OF THE INVENTION

An object of the present invention is to provide a drawing apparatus capable of reliably fixing a sheet-shaped recording material of arbitrary size to an outer peripheral surface of a cylindrical drum.

Another object of the present invention is to provide a drawing apparatus capable of uniformly bringing a sheet-shaped recording material into close contact with an outer peripheral surface of a cylindrical drum.

A drawing apparatus according to one aspect of the present invention for drawing an image on a sheet-shaped recording material comprises a cylindrical drum having a rotary shaft and an outer peripheral surface and having a groove extending in the circumferential direction provided on the outer peripheral surface, a rotation driving device for rotating the drum around the rotary shaft, a fixing member provided so as to be attachable and detachable to or from the groove of the drum and so as to be movable along the groove for fixing the recording material to the outer peripheral surface of the drum, and a drawing unit for drawing an image on the recording material fixed on the outer peripheral surface of the drum, the fixing member comprising a main body member having one side part for pressing one end of the recording material against the outer peripheral surface of the drum, an engaging member provided so as to project on the side of the lower surface of the main body member and engaged with the inside of the groove of the drum, and urging means for urging the other side part of the main body member in the direction away from the outer peripheral surface of the drum.

In the drawing apparatus, the fixing member is provided so as to be attachable and detachable to or from the groove of the cylindrical drum and so as to be movable along the groove. The sheet-shaped recording material is mounted on the outer peripheral surface of the drum, and is fixed by the fixing member.

The engaging member provided in the main body member of the fixing member is engaged with the inside of the groove of the drum, thereby making it possible to fix the fixing member to the drum. The one end of the recording material is interposed between the one side part of the main body member and the outer peripheral surface of the drum, and the other end of the main body member is urged in the direction away from the outer peripheral surface of the drum by the urging means. Thus, the one end of the recording material is pressed against the outer peripheral surface of the drum by the one side part of the main body member. In this state, the drum having the recording material fixed thereto can be rotated around the rotary shaft by the rotation driving device.

The engaging member can be released from the groove of the drum by releasing the engagement of the engaging member provided in the fixing member. Thus, the fixing member can be moved in the circumferential direction along the groove on the outer peripheral surface of the drum. Consequently, the recording material of arbitrary size can be reliably fixed to the outer peripheral surface of the drum.

It is preferable that the length of the one side part of the main body member which is determined on the basis of the engaging member in the circumferential direction of the drum is smaller than the length of the other side part of the main body member.

In this case, at the time of rotation of the drum, centrifugal forces are exerted, respectively, on the one side part and the other side part of the fixing member. Since the length of the one side part of the main body member is smaller than the length of the other side part of the main body member, a rotation moment generated by the one side part of the main body member centered around the engaging member is smaller than a rotation moment generated by the other side part of the main body member, so that a force is exerted in the direction in which the other side part of the main body member separates from the outer peripheral surface of the drum. As a result, the one end of the recording material is firmly pressed against the outer peripheral surface of the drum by the one side part of the main body member.

The higher the rotational speed of the drum is, the larger the force to separate the other end of the main body member from the outer peripheral surface is, and the larger a force for the one side part of the main body member to press the one end of the recording material against the other peripheral surface of the drum is. Even when the drum is rotated at high speed, therefore, the recording material on the outer peripheral surface of the drum is not shifted in position and detached.

A weight may be provided in the other side part of the main body member. In this case, at the time of rotation of the drum, a centrifugal force is exerted on the weight provided in the other side part of the main body member, and a force is exerted in the direction in which the other side part of the main body member separates from the outer peripheral surface of the drum. As a result, the one end of the recording material is firmly pressed against the outer peripheral surface of the drum by the one side part of the main body member.

The higher the rotational speed of the drum is, the larger the centrifugal force exerted on the weight on the other side part of the main body member is, and the larger the force for the one side part of the main body member to press the one end of the recording material against the outer peripheral surface of the drum is. Even when the drum is rotated at high speed, therefore, the recording material on the outer peripheral surface of the drum is not shifted in position and detached.

The urging means may comprise a spring provided between a lower surface of the other side part of the main body member and the outer peripheral surface of the drum, and the weight may be a metal provided in the spring.

In this case, the other side part of the main body member is urged in the direction away from the outer peripheral surface of the drum by a reaction force produced by the spring. In addition, at the time of rotation of the drum, the metal provided in the spring presses the other side part of the main body member in the direction away from the outer peripheral surface of the drum by a centrifugal force. Thus, the one end of the recording material is firmly pressed against the outer peripheral surface of the drum by the one side part of the main body member.

The urging means may comprise a spring provided between the lower surface of the other side part of the main body member and the outer peripheral surface of the drum.

The drawing apparatus may further comprise a fixing member driving device for operating the engaging member of the fixing member to fix the fixing member to the drum or release the fixing member from the drum.

In this case, the engaging member of the fixing member is operated by the fixing member driving device, so that the fixing member can be fixed to the drum or released from the drum. Consequently, it is possible to fix the fixing member to the drum and easily release the fixing member from the drum.

The fixing member driving device may hold the fixing member in a state where the engaging member of the fixing member is released from the groove of the drum.

In this case, the fixing member is held by the fixing member driving device when the engaging member of the fixing member is released from the groove of the drum, thereby making it easy to attach the fixing member to the drum and detach the fixing member from the drum.

The engaging member may be a rotating member provided so as to be rotatable in the main body member and fixed in the groove of the drum as it rotates.

In this case, the rotating member provided in the main body member of the fixing member is rotated, so that the rotating member can be fixed in the groove of the drum. In addition, the rotating member provided in the fixing member is rotated, so that the rotating member can be released from the groove of the drum. Thus, the fixing member can be moved in the circumferential direction along the groove on the outer peripheral surface of the drum.

The fixing member may further comprise a sliding member provided in the main body member so as to be slidable in a predetermined direction for rotating the rotating member as it slides, and the fixing member driving device may comprise a driving member engaged with the sliding member in the fixing member, and a driving member driving mechanism for moving the driving member in the predetermined direction.

In this case, the driving member of the fixing member driving device is engaged with the sliding member in the fixing member, and the driving member is moved in a predetermined direction by the driving member driving mechanism, so that the sliding member in the fixing member can be slid with respect to the main body member to rotate the rotating member. Thus, the rotating member in the fixing member can be fixed in the groove of the drum, or the rotating member in the fixing member can be released from the groove of the drum.

The driving member driving mechanism may comprise a moving member which together with the driving member, moves in the predetermined direction, and the fixing member driving device may further comprise a holding member for holding or releasing the main body member of the fixing member as the moving member moves.

In this case, the moving member in the fixing member driving device is moved, so that the main body member of the fixing member can be held by the fixing member or released. Thus, it is possible to hold the fixing member by the fixing member driving device when the rotating member of the fixing member is released from the groove of the drum and detach the fixing member from the fixing member driving device when the rotating member of the fixing member is fixed in the groove of the drum. Consequently, it is possible to easily attach the fixing member to the drum and detach the fixing member from the drum.

The engaging member may be a lock member having a press portion and an lock portion, the lock portion being insertable into the groove of the drum as the press portion is pressed, while being locked into the groove by releasing the pressing of the press portion.

In this case, the press portion of the lock member provided in the main body member of the fixing member is pressed, so that the lock portion of the lock member can be inserted into the groove of the drum. In addition, the pressing of the press portion of the lock member is released, so that the lock portion is locked into the groove of the drum. Thus, the fixing member can be fixed to the drum. Further, the press portion of the lock member provided in the fixing member is pressed, thereby making it possible to release the locking of the lock portion of the lock member in the groove of the drum. Thus, the fixing member can be moved in the circumferential direction along the groove on the outer peripheral surface of the drum.

The fixing member driving device may comprise a driving device for pressing the press portion of the lock member of the fixing member, and a driving member driving mechanism for moving the driving member toward the press portion of the lock member.

In this case, the driving member in the fixing member driving device is moved toward the press portion of the lock member by the driving member driving mechanism, thereby making it possible to press the press portion of the lock member by the driving member. Thus, it is possible to insert and lock the lock portion of the lock member into the groove of the drum or release the locking of the lock portion of the lock member in the groove of the drum.

The fixing member driving device may comprise a supporting member and a sliding member provided so as to be slidable in a predetermined direction with respect to the supporting member for moving the driving member toward the press portion of the lock member as it slides.

In this case, the sliding member in the fixing member driving device is slid in a predetermined direction with respect to the supporting member, thereby making it possible to move the driving member toward the press portion of the lock member. Thus, the driving member can press the press portion of the lock member.

The fixing member driving device may further comprise a holding member for holding or releasing the main body member of the fixing member as the sliding member slides.

In this case, the sliding member of the fixing member driving device is slid, so that the main body member of the fixing member can be held by the holding member or released. Thus, the fixing member can be held by the fixing member driving device when the lock member of the fixing member is released from the groove of the drum, the fixing member can be detached from the fixing member driving device when the lock member of the fixing member is locked into the groove of the drum. Consequently, it is possible to easily attach the fixing member to the drum and detach the fixing member from the drum.

The lock member may comprise first and second lock members having a press portion and a lock portion, a shaft for connecting the first and second lock members to each other so as to be rotatable, and a spring member for urging the first and second lock members in the direction in which the lock portion of each of the first and second lock members is locked into the groove of the drum, and the first and second lock members may be provided such that the locking of the lock portion in the groove is released by the pressing of the press portion.

The drawing apparatus may further comprise a strip-shaped lock plate provided in the groove of the drum, the spring member may urge the first and second lock members in the direction in which the lock portion of each of the first and second lock members is locked into the lock plate, and the first and second lock members may be provided such that the locking of the lock port ion by the lock plate is released by the pressing of the press portion.

The drawing apparatus may further comprise a moving mechanism for moving the fixing member driving device to a position spaced apart from the outer peripheral surface of the drum and a position in close proximity to the outer peripheral surface of the drum.

In this case, the fixing member driving device can be moved to the position spaced apart from the outer peripheral surface of the drum and the position in close proximity to the outer peripheral surface of the drum by the moving mechanism, thereby making it possible to smoothly attach the fixing member to the drum and detach the fixing member from the drum.

A drawing apparatus according to another aspect of the present invention for drawing an image on a sheet-shaped recording material comprises a cylindrical drum having a rotary shaft and an outer peripheral surface, a rotation driving device for rotating the drum around the rotary shaft, a fixing member provided on the outer peripheral surface of the drum for fixing the recording material on the outer peripheral surface of the drum, a drawing unit for drawing an image on the recording material fixed on the outer peripheral surface of the drum, a first roller arranged along the outer peripheral surface of the drum parallel to the rotary shaft of the drum, a second roller arranged along the first roller, and a roller moving mechanism for moving the first roller to a position spaced apart from the outer peripheral surface of the drum and the second roller and a position in contact with the outer peripheral surface of the drum and the second roller.

In the drawing apparatus, the sheet-shaped recording material is fixed on the outer peripheral surface of the cylindrical drum by the fixing member. In this state, the drum having the recording material fixed thereto can be rotated around the rotary shaft by the rotation driving device.

When the first roller is moved to the position in contact with the outer peripheral surface of the drum and the second roller by the roller moving mechanism, the first roller uniformly presses the recording material fixed on the outer peripheral surface of the drum. Thus, the recording material on the outer peripheral surface of the drum is uniformly brought into close contact with the outer peripheral surface of the drum.

In addition, dust or the like which adheres to the surface of the recording material on the outer peripheral surface of the drum is transferred to the first roller, and the dust or the like which has been transferred to the first roller is transferred to the second roller. Thus, it is possible to remove the dust or the like from the recording material on the outer peripheral surface of the drum.

When the first roller is moved to the position spaced apart from the outer peripheral surface of the drum and the second roller by the roller moving mechanism, the recording material on the outer peripheral surface of the drum is released from the first roller. At this time, the first roller is also spaced apart from the second roller, so that the dust or the like which has been transferred to the second roller is not transferred to the first roller again.

A drawing apparatus according to still another aspect of the present invention for drawing an image on a sheet-shaped recording material comprises a cylindrical drum having a rotary shaft and an outer peripheral surface and having a groove extending in the circumferential direction provided on the outer peripheral surface, a rotation driving device for rotating the drum around the rotary shaft, a first fixing member provided on the outer peripheral surface of the drum for fixing one end of the recording material on the outer peripheral surface of the drum, a second fixing member provided so as to be attachable and detachable to or from the groove of the drum and so as to be movable along the groove for fixing the other end of the recording material on the outer peripheral surface of the drum, a drawing unit for drawing an image on the recording material fixed on the outer peripheral surface of the drum, a first roller arranged along the outer peripheral surface of the drum parallel to the rotary shaft of the drum, a second roller arranged along the first roller, and a roller moving mechanism for moving the second roller to a position spaced apart from the outer peripheral surface of the drum and the second roller and a position in contact with the outer peripheral surface of the drum and the second roller.

The second fixing member may comprise a main body member having one side part for pressing the other end of the recording material against the outer peripheral surface of the drum, an engaging member provided so as to project on the side of the lower surface of the main body member and engaged with the inside of the groove of the drum, and urging means for urging the other side part of the main body member in the direction away from the outer peripheral surface of the drum.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
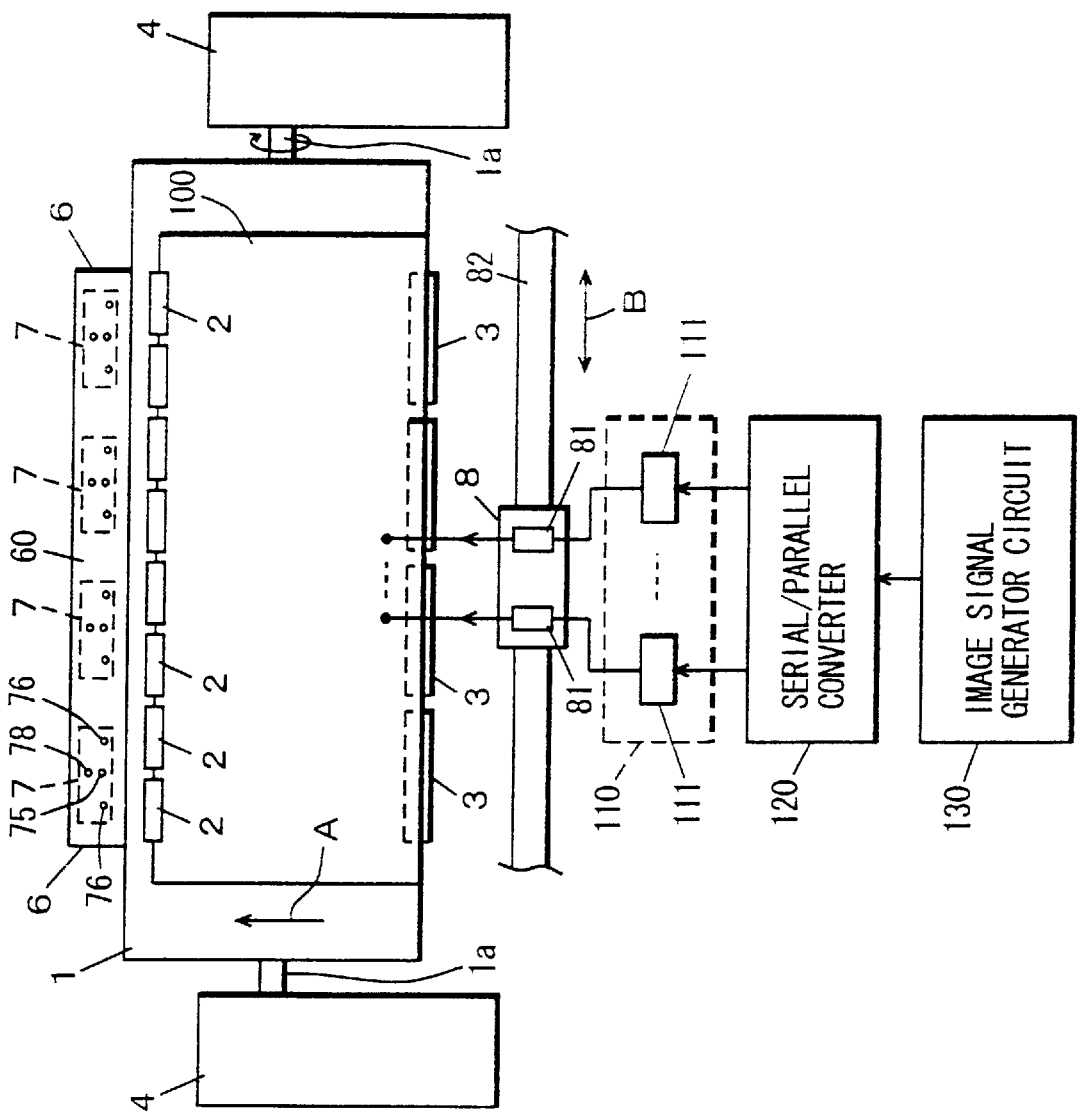
FIG. 1 is a schematic plan view of a drawing apparatus according to one embodiment of the present invention.
Figure 2:
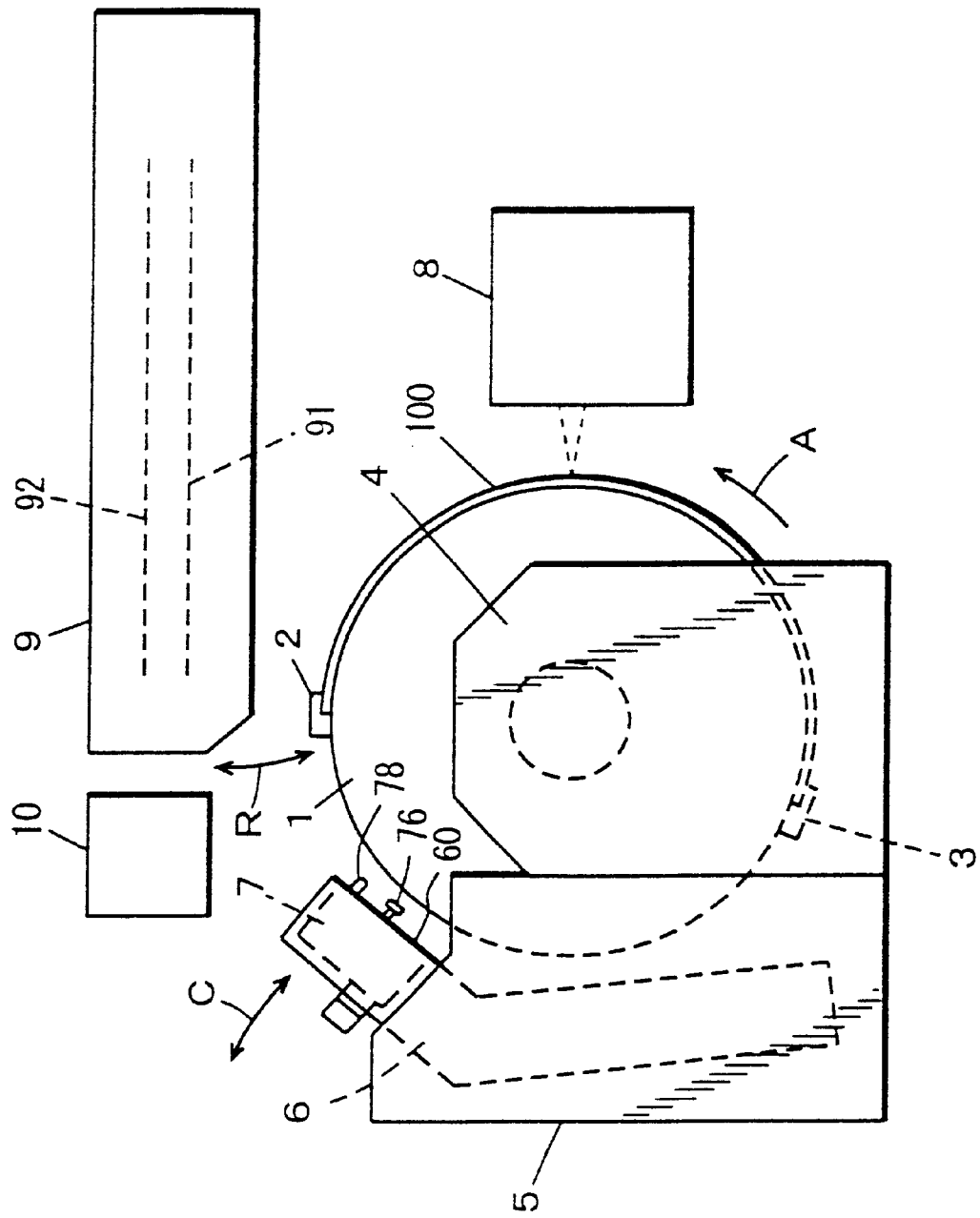
FIG. 2 is a schematic side view of the drawing apparatus shown in FIG. 1.

FIG. 1 is a schematic plan view of a drawing apparatus in a first embodiment of the present invention, and FIG. 2 is a schematic side view of the drawing apparatus shown in FIG. 1.

In FIGS. 1 and 2, the drawing apparatus comprises a cylindrical recording drum 1. The recording drum 1 is rotated in a direction indicted by an arrow A (in a primary scanning direction) around a rotary shaft 1a by a rotation driving device 4. A plate 100 made of aluminum is mounted as a photosensitive material on an outer peripheral surface of the recording drum 1. One end of the plate 100 is fixed to the outer peripheral surface of the recording drum 1 by a plurality of front end clamps 2, and the other end of the plate 100 is fixed to the outer peripheral surface of the recording drum 1 by a plurality of rear end clamps 3.

A recording head 8 comprising a plurality of laser diodes 81 is disposed ahead of the recording drum 1. The recording head 8 is attached to a guide 82 so as to be movable, and moves in a direction indicated by an arrow B (in a secondary scanning direction) in synchronization with the rotation of the recording drum 1.

The plurality of laser diodes 81 in the recording head 8 are driven by a laser diode driving circuit portion 110. The laser diode driving circuit portion 110 comprises a plurality of laser diode driving circuits 111 corresponding to the plurality of laser diodes 81 in the recording head 8.

An image signal generator circuit 130 generates a serial image signal. A serial/parallel converter 120 converts the serial image signal generated by the image signal generator circuit 130 into parallel image signals, and respectively feeds the image signals to the plurality of laser diode driving circuits 111 in the laser diode driving circuit portion 110. Consequently, each of the laser diodes 81 in the recording head 8 is driven by the corresponding laser diode driving circuit 111, to irradiate the plate 100 with laser light.

As shown in FIG. 2, a clamp driving device 5 is provided behind the recording drum 1. The clamp driving device 5 is used for attaching the rear end clamps 3 to the recording drum 1, detaching the rear end clamps 3 from the recording drum 1, and releasing the front end clamps 2 on the recording drum 1.

The clamp driving device 5 comprises a pair of clamp arms 6 which are swingable in a direction indicated by an arrow C. A driving bar 60 is attached between the pair of clamp arms 6, and a plurality of first driving devices 7 are attached to the driving bar 60. As shown in FIG. 1, the first driving device 7 is provided with a driving pin 75, two holding pins 76, and a release pin 78.

In addition, as shown in FIG. 2, a conveying unit 9 is disposed so as to be swingable in a direction indicated by an arrow R above the recording drum 1. The conveying unit 9 has a first conveying path 91 for carrying in a plate and a second conveying path 92 for carrying out a plate. At the time of carry-in of the plate 100, the plate 100 is supplied onto the recording drum 1 through the first conveying path 91 in the conveying unit 9. At the time of carry-out of the plate 100, the plate 100 which has been detached from the recording drum 1 is carried outward through the second conveying path 92 in the conveying unit 9.

A punching device 10 for forming positioning holes in the plate 100 is disposed on the side of a front end of the conveying unit 9. The plate 100 is supplied to the punching device 10 through the first conveying path 91 in the conveying unit 9 before being supplied onto the recording drum 1, so that the positioning holes are formed at a peripheral end of the plate 100. The positioning holes of the plate 100 are engaged with positioning pins (not shown) provided on the outer peripheral surface of the recording drum 1.

Figure 3:
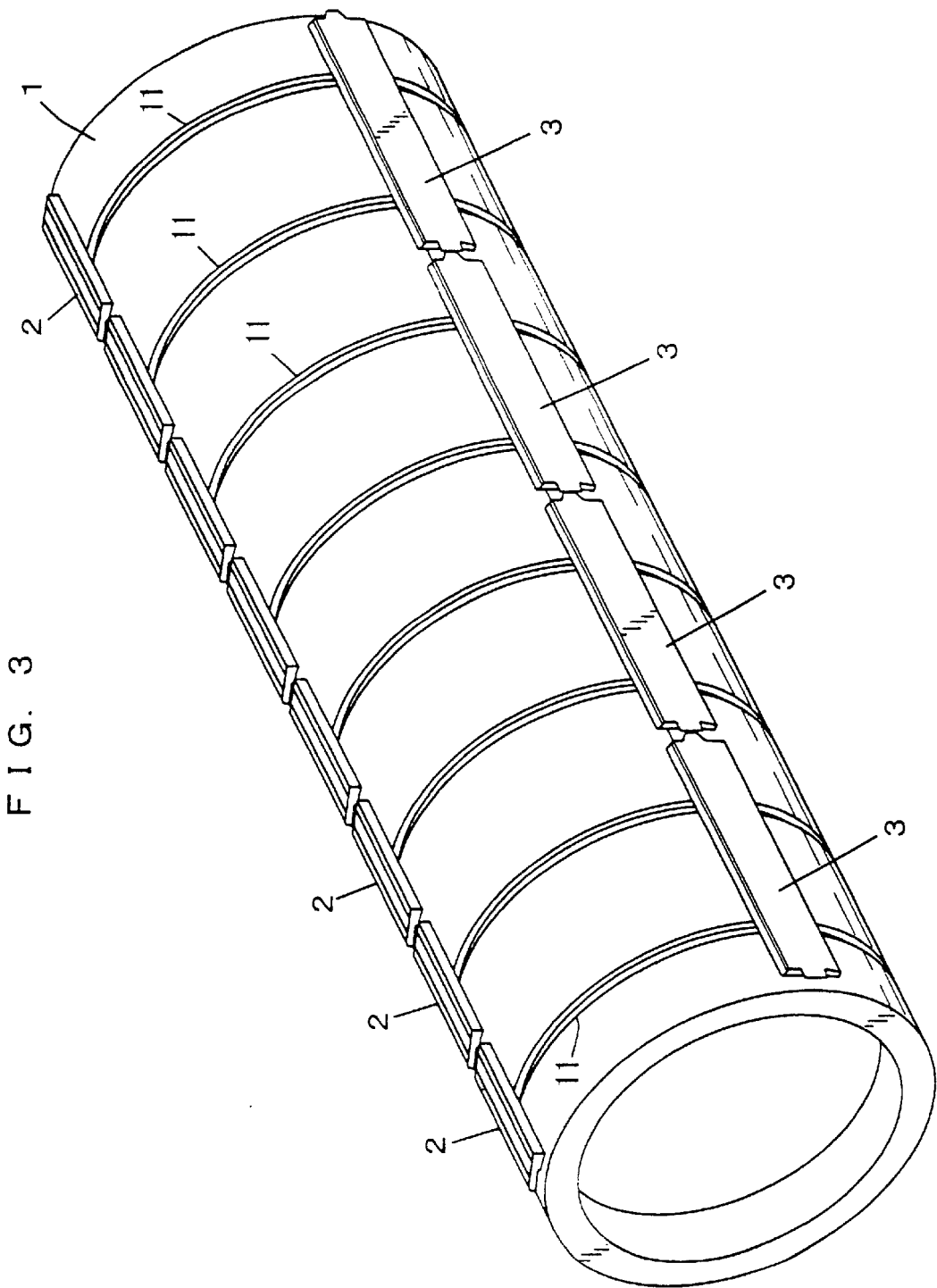
FIG. 3 is a perspective view of a recording drum in the drawing apparatus shown in FIG. 1.

FIG. 3 is a perspective view of the recording drum 1 in the drawing apparatus shown in FIG. 1. As shown in FIG. 3, the recording drum 1 has a plurality of clamp grooves 11 extending in its circumferential direction formed on its outer peripheral surface. The plurality of front end clamps 2 and the plurality of rear end clamps 3 are provided on the outer peripheral surface of the recording drum 1.

The plurality of front end clamps 2 are arranged along the axis of the recording drum 1, and are fixed to the outer peripheral surface of the recording drum 1. The plurality of rear end clamps 3 are arranged along the axis of the recording drum 1, and are respectively attached to the outer peripheral surface of the recording drum 1 so as to be movable in the circumferential direction along the clamp grooves 11.

Figure 4:
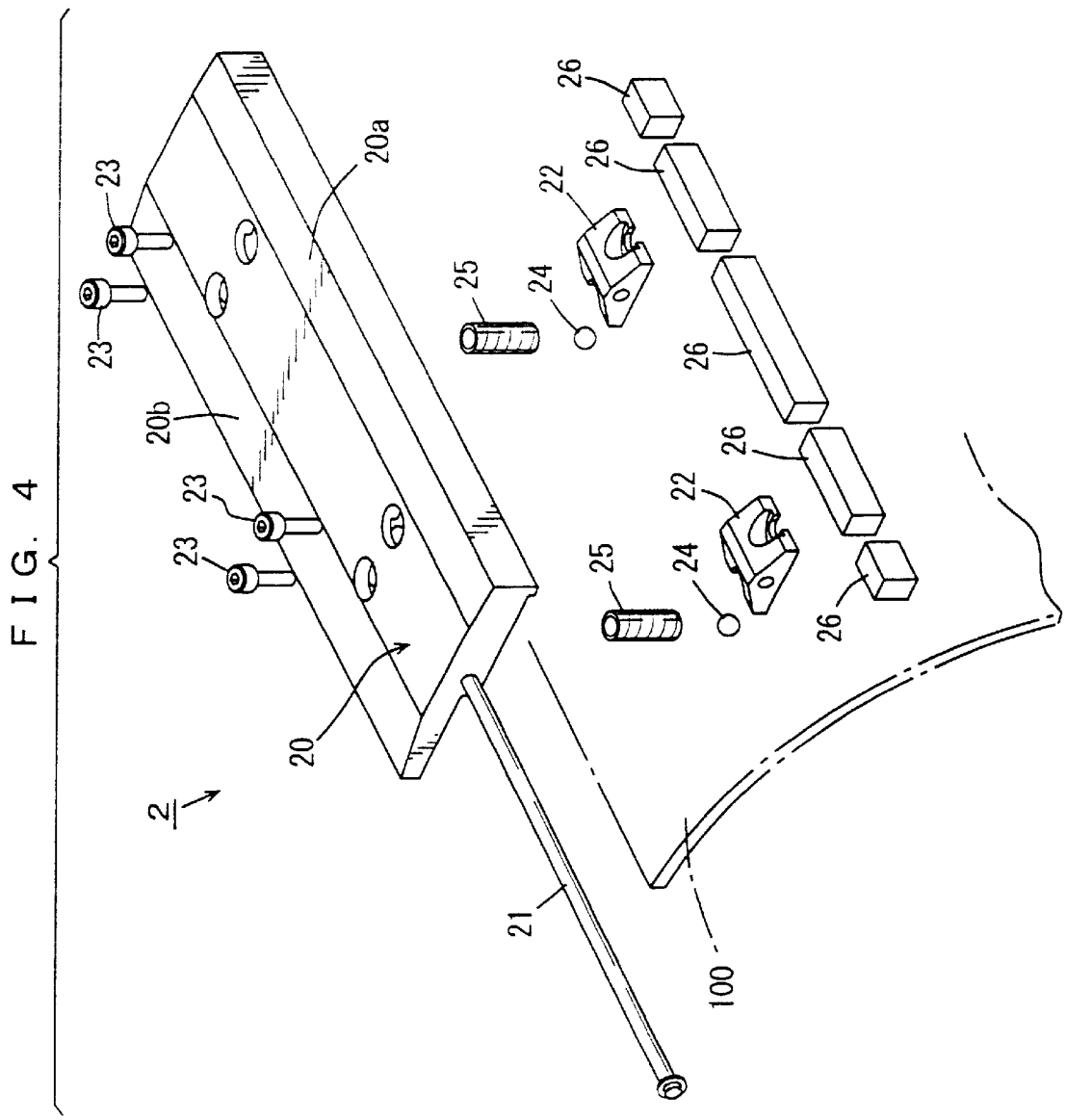
FIG. 4 is an exploded perspective view of a front end clamp in the drawing apparatus shown in FIG. 1.
Figure 5:
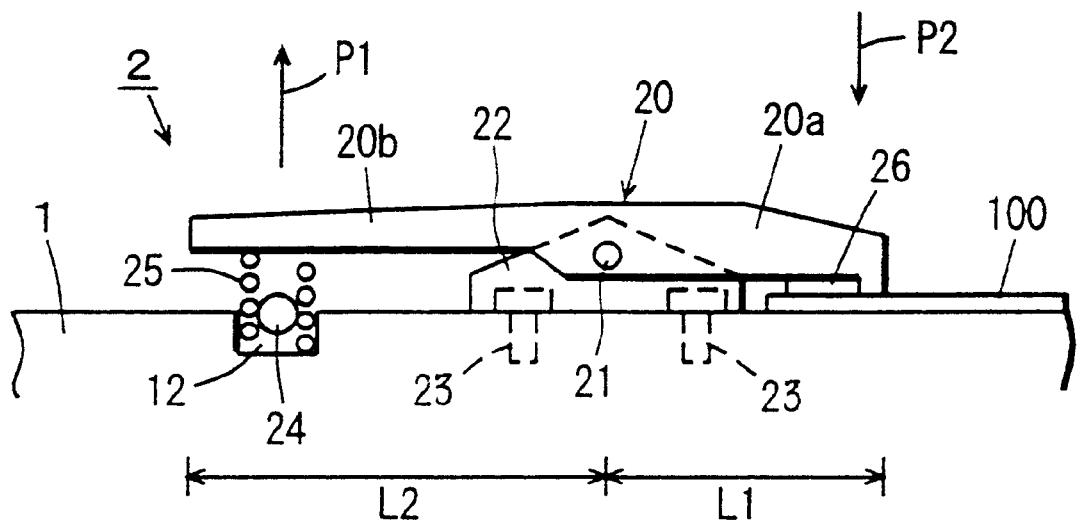
FIG. 5 is a side view of a front end clamp in the drawing apparatus shown in FIG. 1.

FIG. 4 is an exploded perspective view of the front end clamp 2, and FIG. 5 is a side view of the front end clamp 2.

In FIGS. 4 and 5, the front end clamp 2 is constituted by a clamp main body 20, a rotary shaft 21, two bearings 22, four bolts 23, two metal balls 24, two springs 25, and a plurality of pressing rubbers 26.

The bearings 22 are fixed to the recording drum 1 by the bolts 23. The clamp main body 20 is attached to the bearings 22 so as to be rotatable by the rotary shaft 21. The pressing rubbers 26 are mounted on a lower surface of one side part 20a of the clamp main body 20. As shown in FIG. 5, a recess 12 is formed in the recording drum 1 below the other side part 20b of the clamp main body 20. The spring 25 is mounted between a lower surface of the other side part 20b of the clamp main body 20 and the recess 12 of the recording drum 1, and the metal ball 24 is inserted into the spring 25.

The lower surface of the one side part 20a of the clamp main body 20 may be coated with ceramic instead of mounting the pressing rubber 26 thereon. Consequently, the durability is improved without decreasing a frictional force.

The other side part 20b of the clamp main body 20 is urged in the direction away from the recording drum 1 centered around the rotary shaft 21, as indicated by an arrow P1, by a reaction force produced by the spring 25. Consequently, a force in the direction in which the one side part 20a of the clamp main body 20 is brought near the recording drum 1, as indicated by an arrow P2, so that one end of the plate 100 on the recording drum 1 is pressed by the pressing rubber 26.

The length L1 of the one side part 20a of the clamp main body 20 which is determined on the basis of the rotary shaft 21 is set to a length smaller than the length L2 of the other side part 20b of the clamp main body 20.

At the time of rotation of the recording drum 1, the metal ball 24 moves in the direction indicated by the arrow P1 by a centrifugal force, to push the other side part 20b of the clamp main body 20 up in the direction away from the recording drum 1. In addition, centrifugal forces are respectively exerted on the one side part 20a and the other side part 20b of the clamp main body 20. Since the length L1 of the one side part 20a of the clamp main body 20 is set to a length smaller than the length of the other side part 20b of the clamp main body 20, a rotation moment generated by the one side part 20a of the clamp main body 20 centered around the rotary shaft 21 is smaller than a rotation moment generated by the other side part 20b. Consequently, a force in the direction in which the other side part 20b of the clamp main body 20 is separated from the outer peripheral surface of the recording drum 1 is exerted, so that the one end of the plate 100 is firmly pressed against the outer peripheral surface of the recording drum 1 by the pressing rubber 26 in the one side part 20a of the clamp main body 20.

The higher the rotational speed of the recording drum 1 is, the larger a force exerted on the other side part 20b of the clamp main body 20 is, and the larger a force for the pressing rubber 26 in the one side part 20a of the clamp main body 20 to press the one end of the plate 100 against the outer peripheral surface of the recording drum 1 is. Even when the recording drum 1 is rotated at high speed, therefore, the one end of the plate 100 is reliably fixed to the outer peripheral surface of the recording drum 100 by the front end clamp 20, so that the plate 100 on the outer peripheral surface of the recording drum 1 is not shifted in position and detached.

Figure 6:
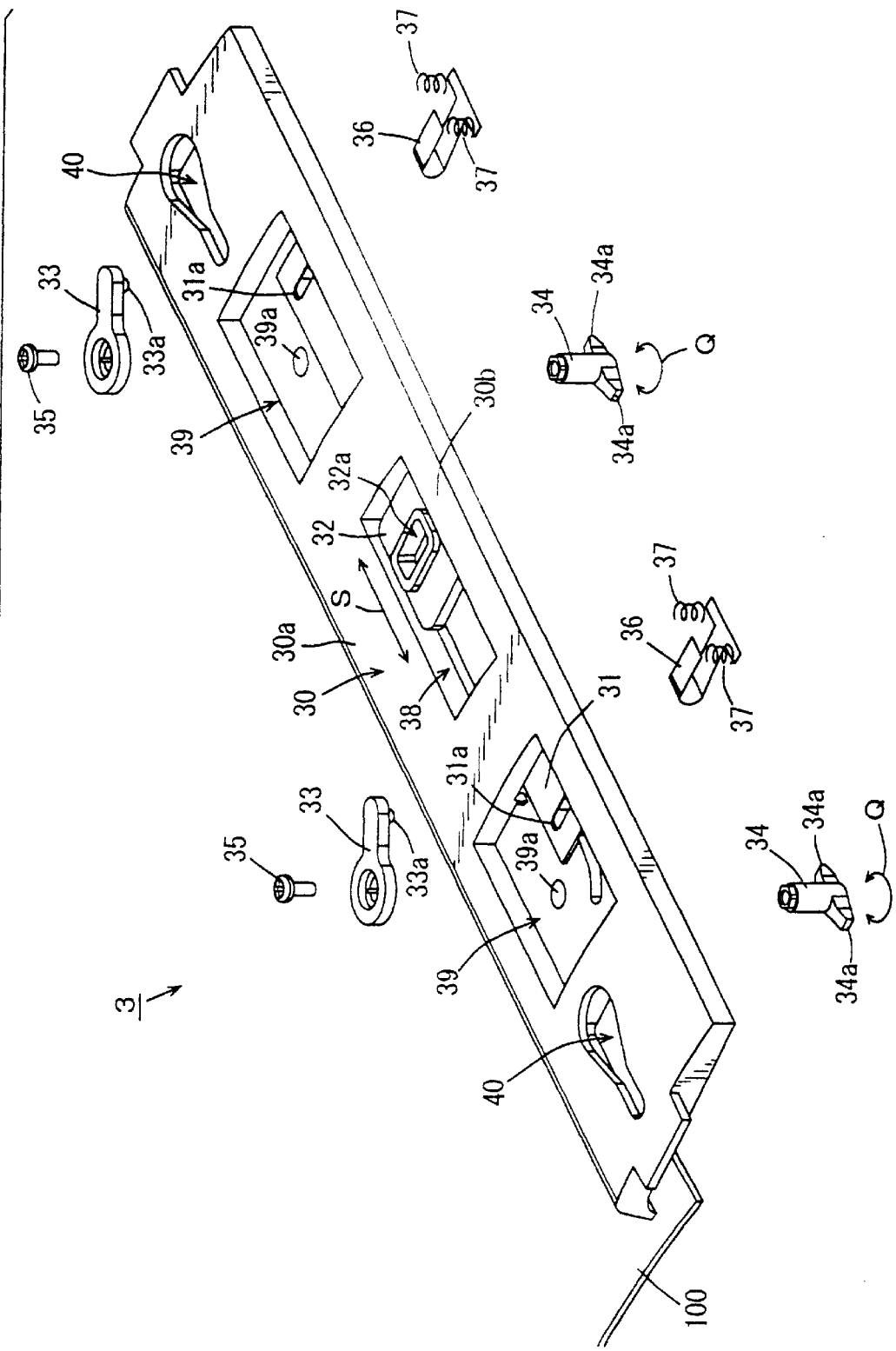
FIG. 6 is an exploded perspective view of a rear end clamp in the drawing apparatus shown in FIG. 1.
Figure 7:
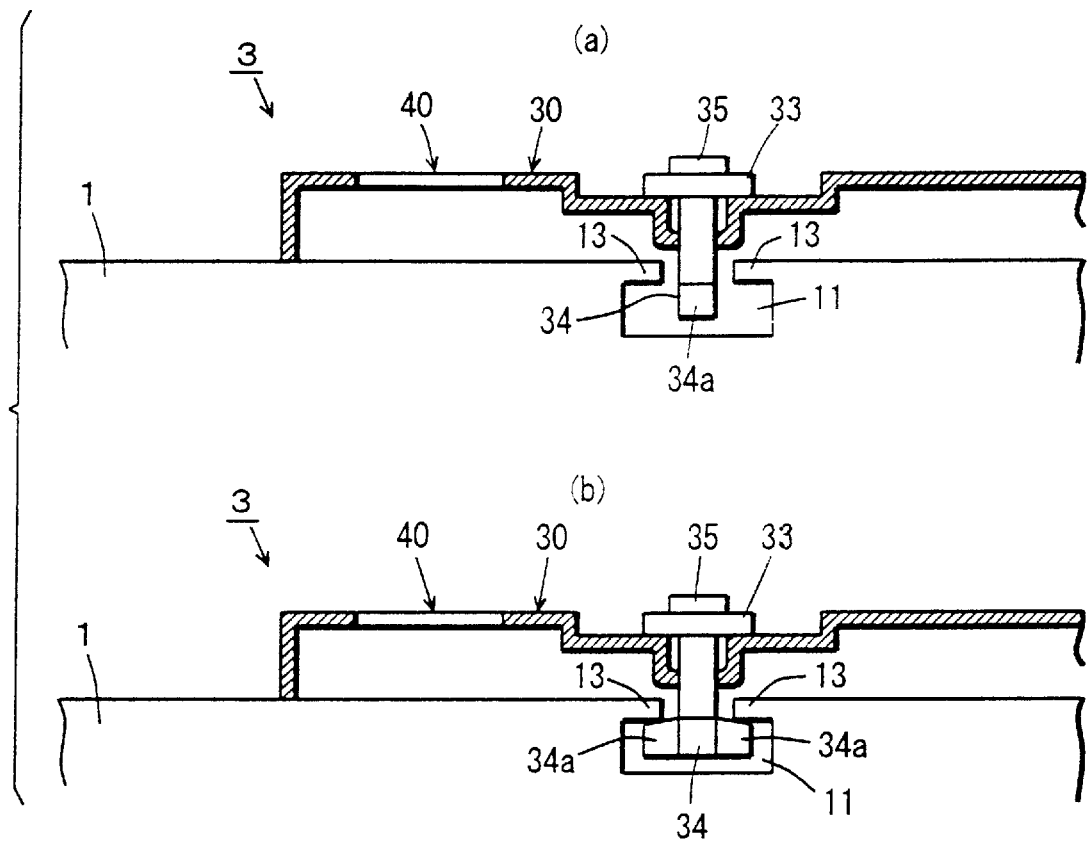
FIGS. 7(a) and 7(b) are partially sectional views along the length of the rear end clamp in the drawing apparatus shown in FIG. 1.
Figure 8:
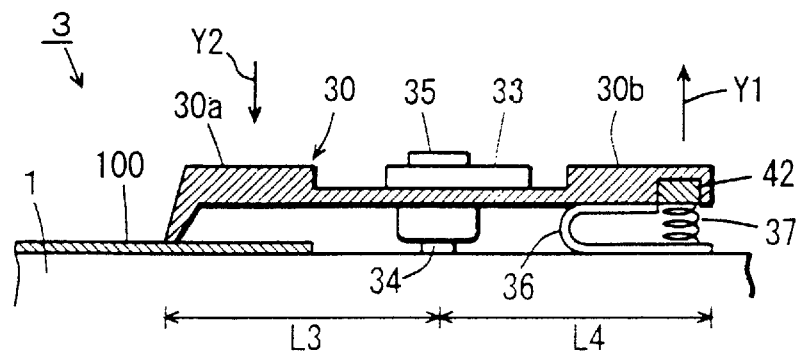
FIG. 8 is a cross-sectional view along the width of the rear end clamp in the drawing apparatus shown in FIG. 1.

FIG. 6 is an exploded perspective view of the rear end clamp 3, FIGS. 7(a) and 7(b) are partially sectional views along the length of the rear end clamp 3, and FIG. 8 is a cross-sectional view along the width of the rear end clamp 3.

As shown in FIGS. 6 to 8, the rear end clamp 3 is constituted by a clamp main body 30, a clamp bolt connecting plate 31, an engaging member 32, two first clamp bolts 33, two second clamp bolts 34, two screws 35, two leaf springs 36, and four springs 37.

A rectangular recess 38 is provided at the center of the clamp main body 30, and rectangular recesses 39 are respectively provided on both sides of the recess 38. Holding holes 40 are respectively provided in the vicinities of both ends of the clamp main body 30. The holding holes 40 are composed of circular parts and narrow parts. The holding pins 76 in the first driving device 7, described later, are respectively inserted into the holding holes 40.

The clamp bolt connecting plate 31 is provided so as to be slidable in a direction indicated by an arrow S in the three recesses 38, 39 upon penetrating side surfaces of the recesses 38, 39. The engaging member 32 is fixed to the clamp bolt connecting plate 31 in the recess 38. The driving pin 75 in the first driving device 7 is engaged with an engaging hole 32a of the engaging member 32. Long holes 31a are respectively formed in the vicinities of both ends of the clamp bolt connecting plate 31.

The second clamp bolts 34 have projections 34a projecting toward both their sides provided on their outer peripheral surfaces. The second clamp bolts 34 are inserted into holes 39a provided on the bottom surfaces of the recesses 39 of the clamp main body 30. The first clamp bolts 33 are attached to the heads of the second clamp bolts 34 by the screws 35. Projections 33a are provided on the lower surfaces of the first clamp bolts 33. The projections 33a of the first clamp bolts 33 are engaged with the long holes 31a of the clamp bolt connecting plate 31. Consequently, when the engaging member 32 slides in the direction indicated by the arrow S, the clamp bolt connecting plate 31, together with the engaging member 32, slides in the direction indicated by the arrow S, so that the first clamp bolts 33, together with the second clamp bolts 34, rotate in a direction indicated by an arrow Q.

As shown in FIGS. 7(a) and 7(b), inner flanges 13 projecting inward are respectively provided at upper ends on both side surfaces of the clamp groove 11 formed in the recording drum 1. As shown in FIG. 7(a), when the projection portions 34a of the second clamp bolt 34 are positioned parallel to the clamp groove 11, the projection portions 34a are not engaged with the inner flanges 13 of the clamp groove 11. In this case, the rear end clamp 3 can be detached from the recording drum 1.

On the other hand, as shown in FIG. 7(b), when the projection portions 34a of the second clamp bolt 34 are positioned perpendicularly to the clamp groove 11 of the recording drum 1, the projection portions 34a are engaged with the inner flanges 13 of the clamp groove 11. Consequently, the rear end clamp 3 is fixed to the recording drum 1.

As shown in FIG. 8, the other end of the plate 100 is inserted between the lower surface of one side part 30a of the clamp main body 30 and the outer peripheral surface of the recording drum 1. A lead plate 42 is embedded in the other side part 30b of the clamp main body 30. In addition, the leaf spring 36 and the spring 37 are mounted on the lower surface of the other side part 30b of the clamp main body 30.

The other side part 30b of the clamp main body 30 is urged in the direction away from the recording drum 1 centered around the second clamp bolt 34, as indicated by an arrow Y1, by reaction forces produced by the leaf spring 36 and the spring 37. Consequently, a force in the direction in which the one side part 30a of the clamp main body 30 is brought near the recording drum 1, as indicated by an arrow Y2, so that the one end of the plate 100 on the recording drum 1 is pressed by the lower surface of the one side part 30a of the clamp main body 30.

The length L3 of the one side part 30a of the clamp main body which is determined on the basis of the second clamp bolt 34 is set to a length smaller than the length L4 of the other side part 30b of the clamp main body 30.

At the time of rotation of the recording drum 1, a centrifugal force is exerted in the direction indicated by the arrow Y1 on the lead plate 42 embedded in the lower surface of the other side part 30b of the clamp main body 30. In addition, centrifugal forces are respectively exerted on the one side part 30a and the other side part 30b of the clamp main body 30. Since the length L3 of the one side part 30a of the clamp main body 30 is set to a length smaller than the length L4 of the other side part 30b of the clamp main body 30, a rotation moment generated by the one side part 30a of the clamp main body 30 centered around the second clamp bolt 34 is smaller than a rotation moment generated by the other side part 30b. Consequently, a force in the direction in which the other side part 30b of the clamp main body 30 is separated from the outer peripheral surface of the recording drum 1 is exerted, so that the other end of the plate 100 is firmly pressed against the outer peripheral surface of the recording drum 1 by the one side part 30a of the clamp main body 30.

The higher the rotational speed of the recording drum 1 is, the larger a force to be exerted on the other side part 30b of the clamp main body 30 is, and the stronger a force for the one side part 30a of the clamp main body 30 to press the other end of the plate 100 against the outer peripheral surface of the recording drum 1 is. When the recording drum 1 is rotated at high speed, therefore, the other end of the plate 100 is reliably fixed to the outer peripheral surface of the recording drum 1 by the rear end clamp 3, so that the plate 100 on the outer peripheral surface of the recording drum 1 is not shifted in position and detached.

Figure 9:
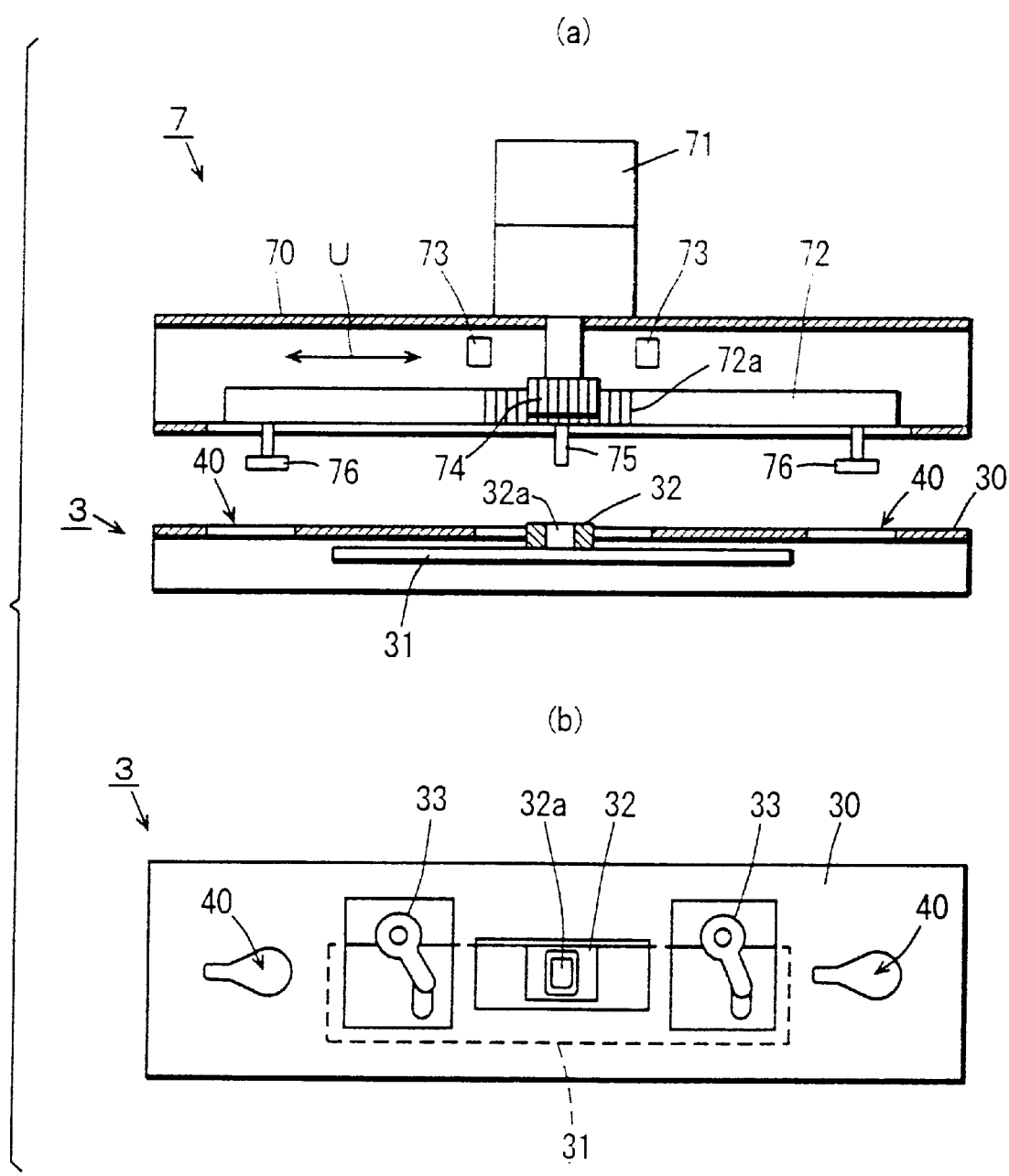
FIG. 9(a) is a cross-sectional view in a state before the rear end clamp is held in a first driving device in the drawing apparatus shown in FIG. 1
FIG. 9(b) is a plan view of the rear end clamp in such state.

FIG. 9(a) is a cross-sectional view in a state before the rear end clamp 3 is held in the first driving device 7, and FIG. 9(b) is a plan view of the rear end clamp 3. In addition, FIG. 10(a) is a cross-sectional view in a state where the rear end clamp 3 is held in the first driving device 7, and FIG. 10(b) is a plan view of the rear end clamp 3.

As shown in FIGS. 9(a) and 9(b), the first driving device 7 is constituted by a driving device main body 70, a clamp bolt driving motor 71, a driving member 72, and a position sensors 73. A gear 74 is attached to the clamp bolt driving motor 71. A plane gear 72a which is meshed with the gear 74 is provided on a side surface of the driving member 72. The driving member 72 is provided so as to be slidable in a direction indicated by an arrow U by the rotation of the clamp bolt driving motor 71. In addition, driving pin 75 is provided at the center on the lower surface of the driving member 72, and holding pins 76 are respectively provided in the vicinities of both ends of the lower surface of the driving member 72. The position sensors 73 detect the position of the driving member 72.

In the state of FIGS. 9(a) and 9(b), when the first driving device 7 is brought near the rear end clamp 3, the driving pin 75 is inserted into an engaging hold 32a of an engaging member 32 in the rear end clamp 3, and the holding pins 76 are inserted into the circular parts of the holding holes 40 in the rear end clamp 3.

Thereafter, when the clamp bolt driving motor 71 rotates, the driving member 72 moves in a direction indicated by an arrow U1, so that the engaging member 32 which is engaged with the driving pin 75, together with a clamp bolt connecting plate 31, slides in the direction indicated by the arrow U1, as shown in FIGS. 10(a) and 10(b). Consequently, the first clamp bolts 33, together with the second clamp bolts 34, rotate in the directions shown by the arrows V1 and V2. In addition, the holding pins 76 move to the narrow parts of the holding holes 40 in the rear end clamp 3. Consequently, the rear end clamp 3 is held in the first driving device 7, and the projection portions 34a of the second clamp bolts 34 are brought into the state parallel to the clamp groove 11 of the recording drum 1, as shown in FIG. 7(a). In this state, the second clamp bolts 34 in the rear end clamp 3 can be inserted into the clamp groove 11 of the recording drum 1.

Subsequently, when the clamp bolt driving motor 71 rotates in the opposite direction, the engaging member 32 which is engaged with the driving pin 75, together with the clamp bolt connecting plate 31, slides in the opposite direction to the direction indicated by the arrow U1, so that the first clamp bolts 33, together with the second clamp bolts 34, rotate in the opposite direction. In addition, the holding pins 76 move to the circular parts of the holding holes 40 in the rear end clamp 3. Consequently, the projection portions 34a of the second clamp bolts 34 are brought into the state perpendicular to the clamp groove 11 of the recording drum 1, as shown in FIG. 7(b). As a result, the second clamp bolts 34 in the rear end clamp 3 can be fixed to the clamp groove 11 of the recording drum 1, and the first driving device 7 can be detached from the rear end clamp 3.

By operations reverse to the above-mentioned operations, the rear end clamp 3 is detached from the recording drum 1, and the rear end clamp 3 can be held in the first driving device 7.

Figure 11:
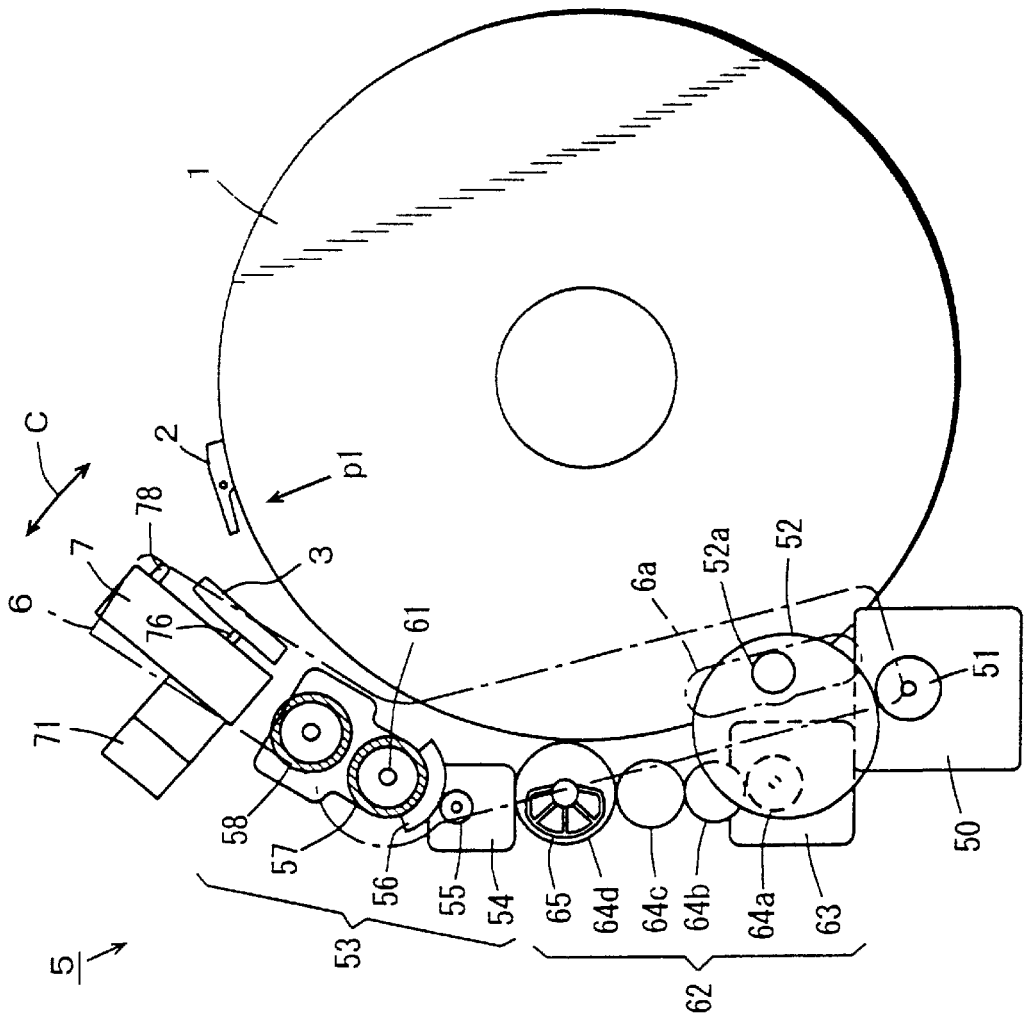
FIG. 11 is a side view showing the construction of a clamp driving device in the drawing apparatus shown in FIG. 1.
Figure 12:
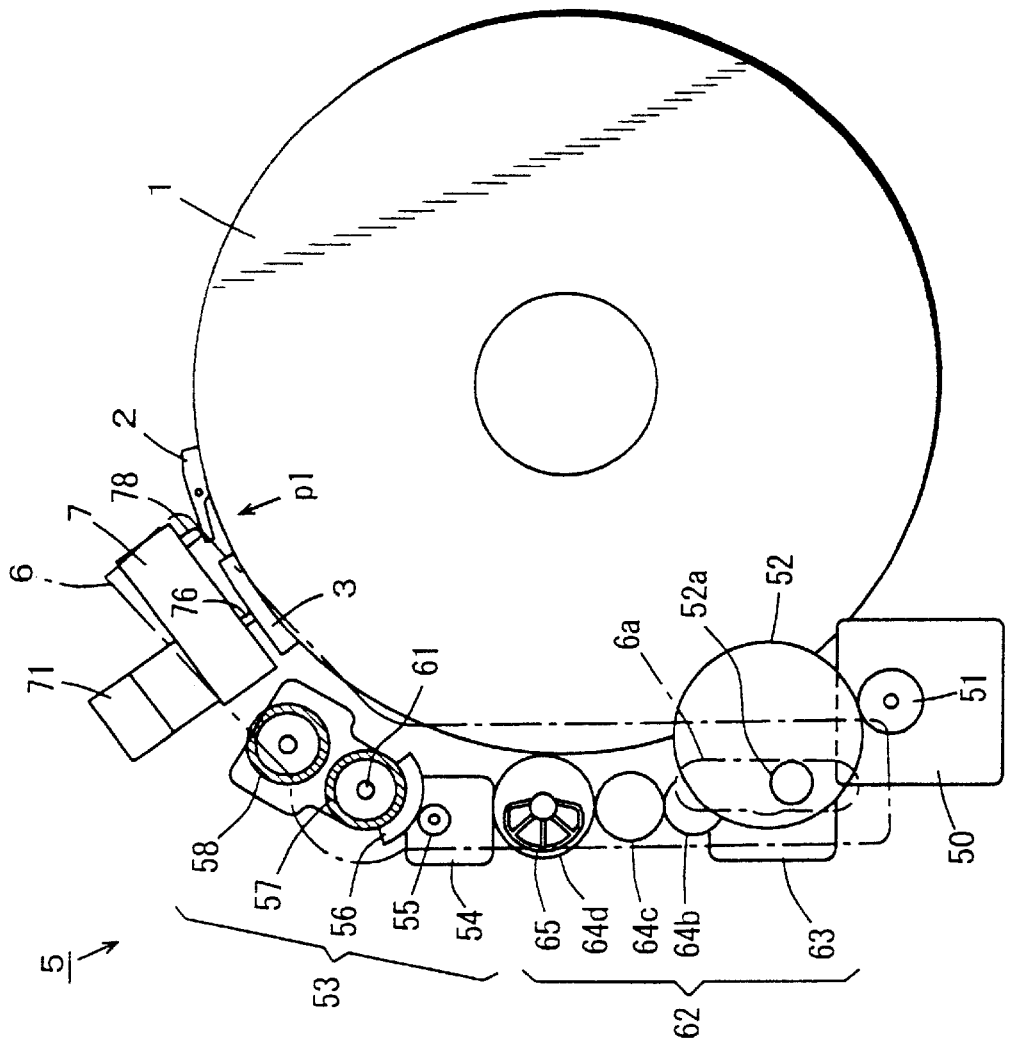
FIG. 12 is a side view showing the operation of the clamp driving device shown in FIG. 11.

FIG. 11 is a side view showing the construction of the clamp driving device 5.

A gear 51 is attached to a clamp arm driving motor 50. The gear 51 is meshed with a gear 52, and an engaging portion 52a provided in the gear 52 is engaged with a long hole 6a of the clamp arm 6. The clamp arm driving motor 50 rotates, so that the clamp arm 6 swings in a direction indicted by an arrow C centered around a rotary shaft 61.

In addition, the clamp driving device 5 is provided with a squeegee device 53 and a second driving device 62. The squeegee device 53 is constituted by a squeegee driving motor 54, a gear 55, a swing member 56, a gum roller 57, and a squeegee roller 58. The gear 55 is attached to the squeegee driving motor 54, and the swing member 56 is meshed with the gear 55. The swing member 56 is attached to the squeegee roller 58. When the squeegee driving motor 54 rotates, the swing member 56 swings through the gear 55, so that the squeegee roller 58 is brought into close contact with the outer peripheral surface of the recording drum 1.

The second driving device 62 is constituted by a cam driving motor 63, gears 64a, 64b, 64c, 64d, and a cam 65. The gear 64a is attached to the cam driving motor 63. Torque generated by the cam driving motor 63 is transmitted to the gear 64d through the gears 64a, 64b, 64c. The cam 65 is attached to the gear 64d.

As shown in FIG. 11, the position of the clamp arm 6 in a state where the first driving device 7 is spaced apart from the outer peripheral surface of the recording drum 1 is referred to as an origin position, and the position of the clamp arm 6 in a state where the first driving device 7 is in close proximity to the outer peripheral surface of the recording drum 1 is referred to as a terminal position.

Next, description is now made of the operation of the clamp driving device 5 while referring to FIGS. 11 to 18.

First, as shown in FIG. 11, after the recording drum 1 is rotated until the front end clamp 2 attached to the outer peripheral surface of the recording drum 1 reaches a position p1 of the release pin 78 of the first driving device 7, the rotation of the recording drum 1 is stopped. The clamp arm 6 swings from the origin position shown in FIG. 11 to the terminal position shown in FIG. 12 by the clamp arm driving motor 50. Then, the first driving device 7 is brought near the front end clamp 2 attached to the outer peripheral surface of the recording drum 1, so that the release pin 78 presses one side part of the front end clamp 2.

Figure 13:
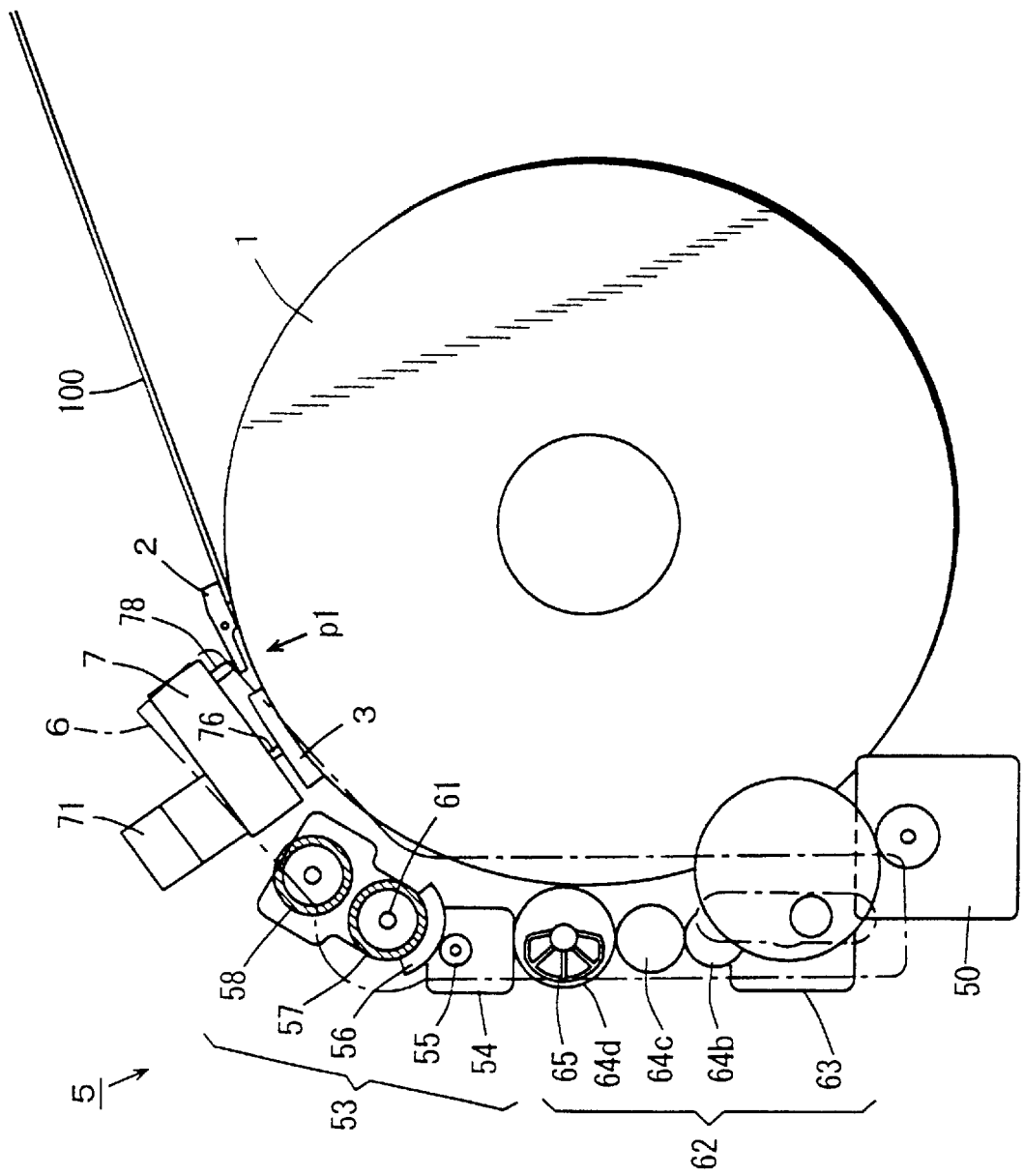
FIG. 13 is a side view showing the operation of the clamp driving device shown in FIG. 11.

Consequently, a clearance is formed between the other side part of the front end clamp 2 and the outer peripheral surface of the recording drum 1, as shown in FIG. 13. In this state, the plate 100 is carried inward through the first conveying path 91 in the conveying unit 9 shown in FIG. 2, and a front end of the plate 100 is inserted into the clearance between the other side part of the front end clamp 2 and the outer peripheral surface of the recording drum 1.

Thereafter, the clamp arm 6 is returned to the origin position by the clamp arm driving motor 50, so that the first driving device 7 separates from the outer peripheral surface of the recording drum 1. Consequently, the front end of the plate 100 is fixed to the outer peripheral surface of the recording drum 1 by the front end clamp 2.

Figure 14:
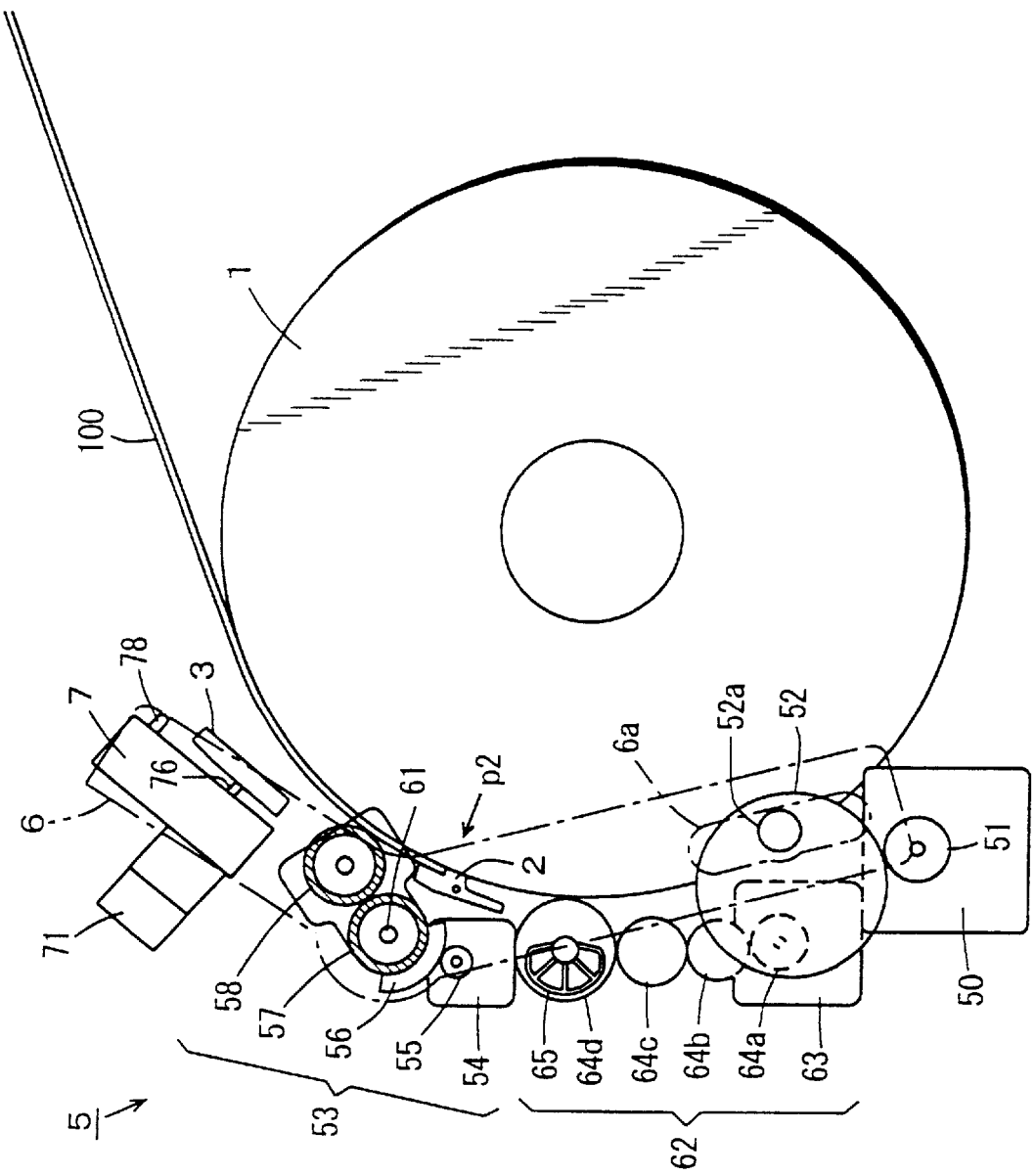
FIG. 14 is a side view showing the operation of the clamp driving device shown in FIG. 11.

The plate 100 is conveyed by the conveying unit 9 shown in FIG. 2 while rotating the recording drum 1. When the front end clamp 2 reaches a position p2 where the front end clamp 2 passes through the squeegee roller 58, as shown in FIG. 14, the squeegee roller 58 is brought into close contact with the plate 100 on the outer peripheral surface of the recording drum 1 by the squeegee driving motor 54. At this time, the squeegee roller 58 is also brought into contact with the gum roller 57. Dust or the like is transferred onto an outer peripheral surface of the squeegee roller 58 from the surface of the plate 100 by the rotation of the recording drum 1, so that the dust or the like which has been transferred to the squeegee roller 58 is further transferred to the gum roller 57.

Figure 15:
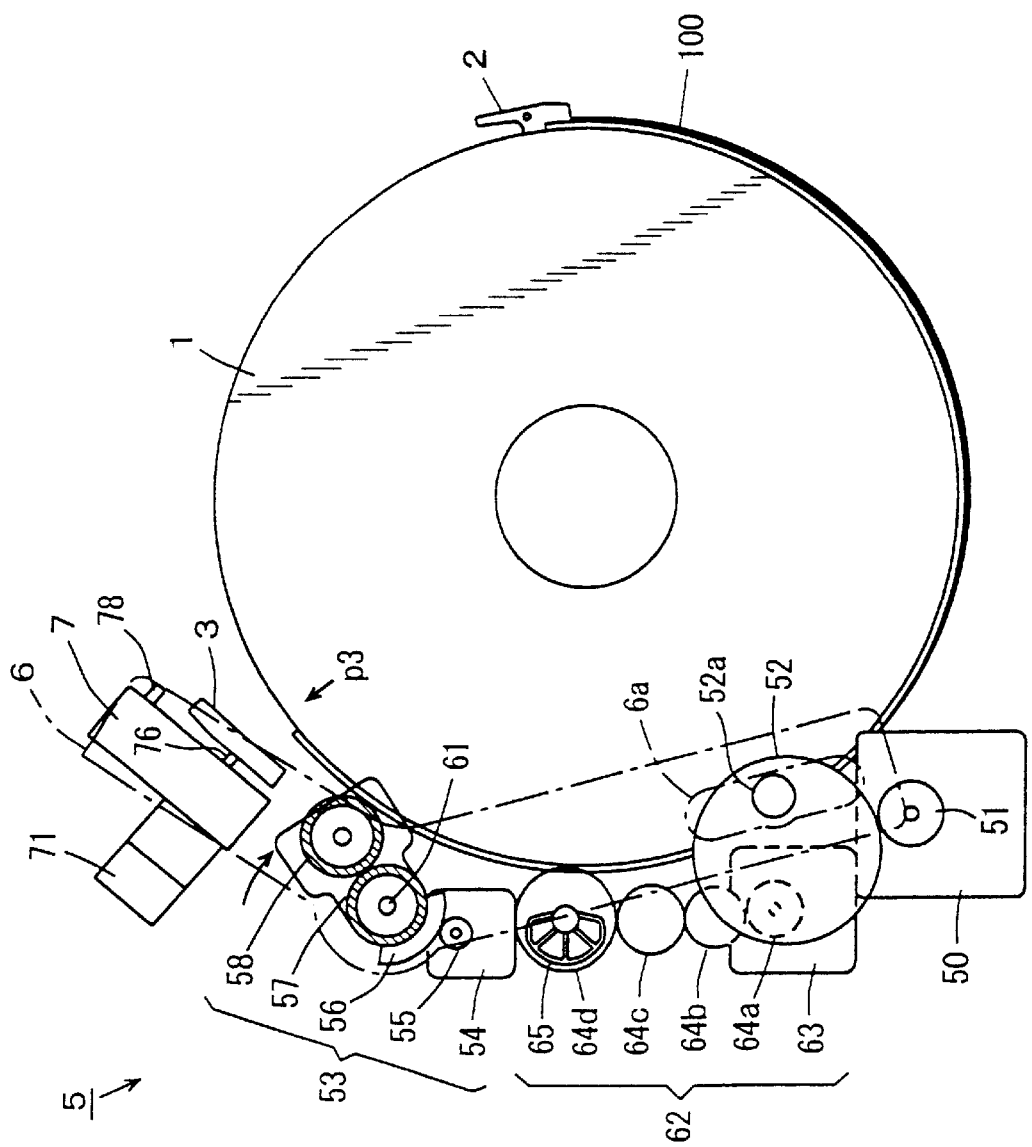
FIG. 15 is a side view showing the operation of the clamp driving device shown in FIG. 11.

Thereafter, when a rear end of the plate 100 reaches a position p3 of the rear end clamp 3 held in the first driving device 7 by the rotation of the recording drum 1, as shown in FIG. 15, the rotation of the recording drum 1 is stopped. The stop position differs depending on the size of the plate 100 to be supplied. In the present embodiment, the plate 100 is fixed utilizing the groove 11 formed in the circumferential direction of the recording drum 1, so that the plate 100 of arbitrary size can be reliably fixed on the outer peripheral surface of the recording drum 1.

Figure 16:
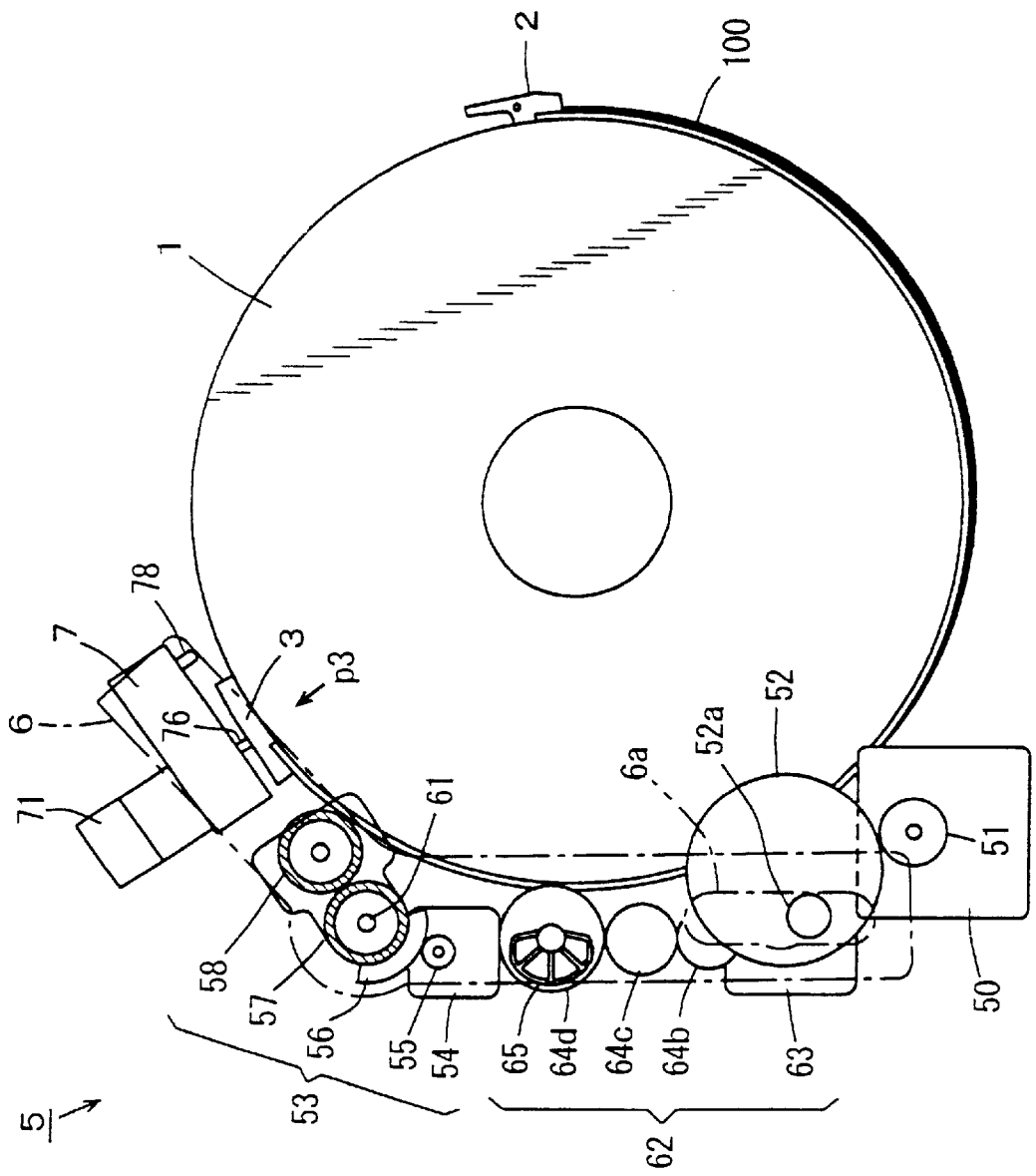
FIG. 16 is a side view showing the operation of the clamp driving device shown in FIG. 11.

In this state, as shown in FIG. 16, the clamp arm 6 swings to the terminal position by the clamp arm driving motor 50, and the rear end clamp 3 held by the holding pins 76 of the first driving device 7 presses the rear end of the plate 100 on the recording drum 1. In this case, as shown in FIG. 7(a), the second clamp bolts 34 of the rear end clamp 3 are inserted into the clamp groove 11 of the recording drum 1, so that the plate 100 is pressed by the one side part of the clamp main body 30.

Figure 10:
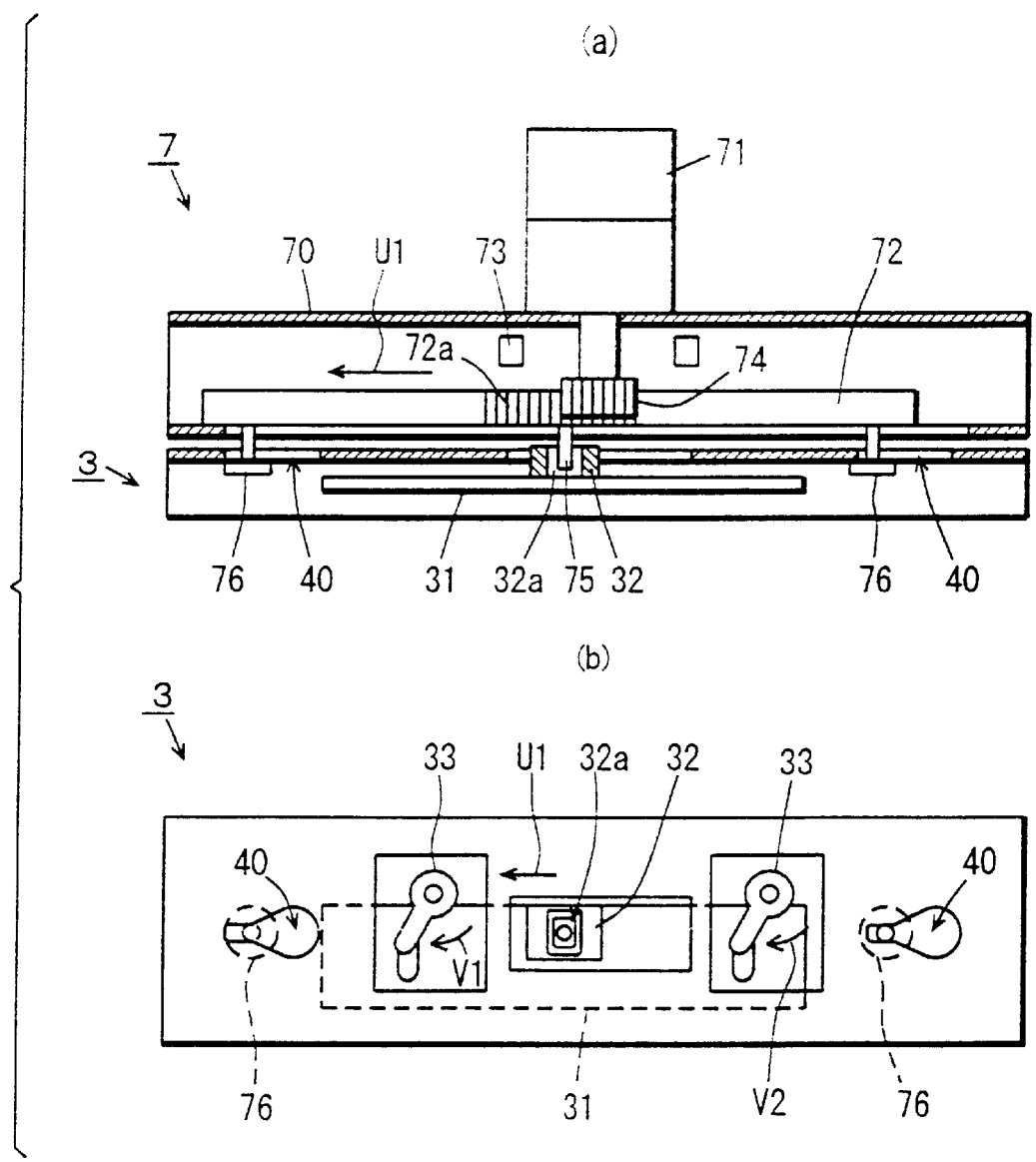
FIG. 10(a) is a cross-sectional view in a state where the rear end clamp is held in the first driving device in the drawing apparatus shown in FIG. 1
FIG. 10(b) is a plan view of the rear end clamp in such state.

Next, the clamp bolt driving motor 71 in the first driving device 7 shown in FIG. 10 is then rotated, and the clamp bolt connecting plate 31 in the rear end clamp 3 is slid by the driving pin 75, to fix the second clamp bolts 34 in the clamp groove 11 of the recording drum 1 by the projection portions 34a, as shown in FIG. 7(b). Simultaneously, the holding pins 76 of the first driving device 7 shown in FIG. 10 move to the circular parts of the holding holes 40 in the rear end clamp 3, so that the rear end clamp 3 is released from the first driving device 7.

Figure 17:
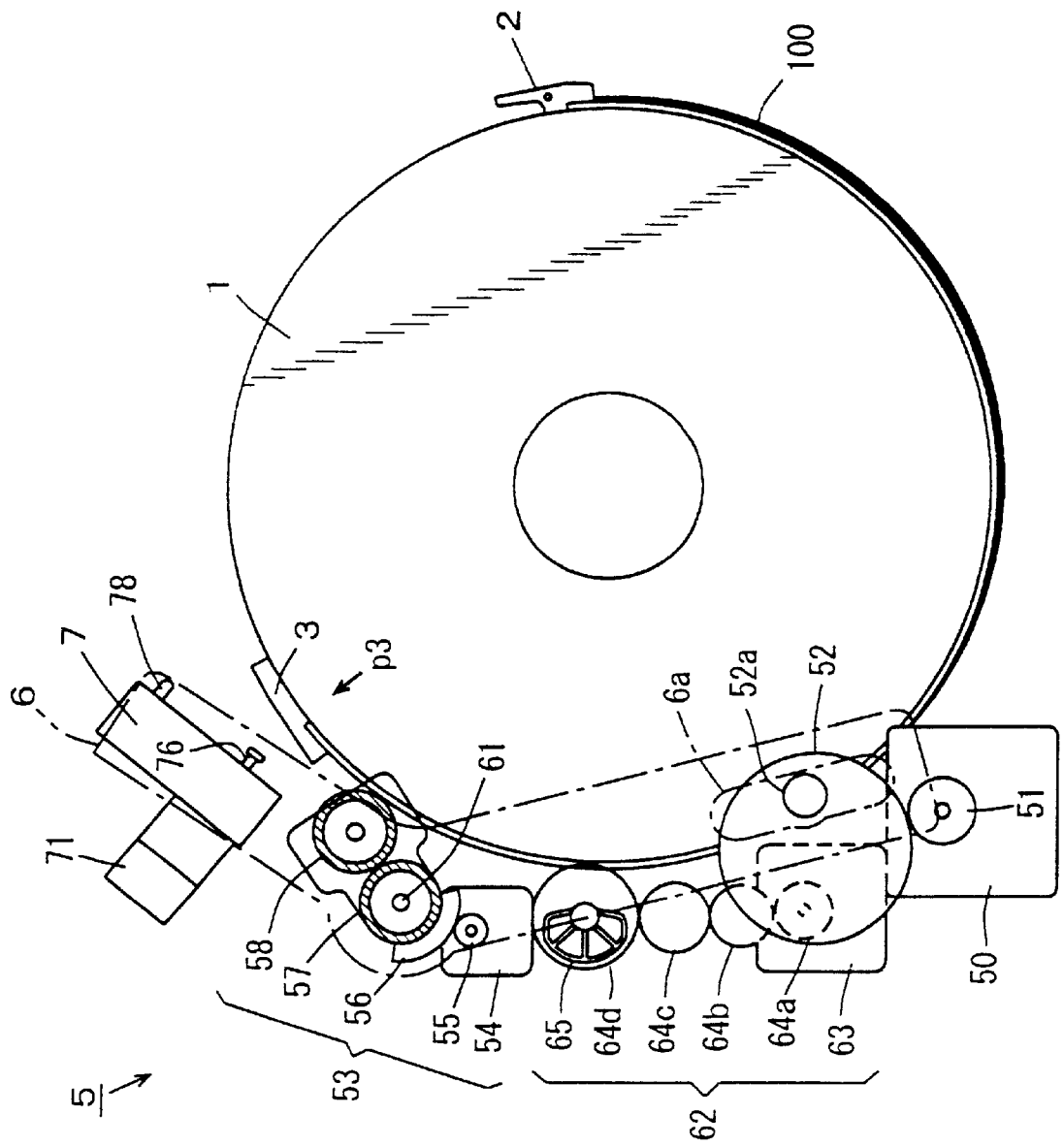
FIG. 17 is a side view showing the operation of the clamp driving device shown in FIG. 11.

Thereafter, the clamp arm 6 is returned to the origin position by the clamp arm driving motor 50, as shown in FIG. 17. Consequently, the rear end clamp 3 is detached from the first driving device 7. As a result, the rear end of the plate 100 is fixed to the outer peripheral surface of the recording drum 1 by the rear end clamp 3. The plate 100 is thus fixed to the outer peripheral surface of the recording drum 1, so that an image is drawn on the plate 100 by the recording head 8 shown in FIG. 1.

When the drawing of the image on the plate 100 by the recording head 8 is completed, the rear end clamp 3 is moved to the position p3, shown in FIG. 17, of the holding pins 76 of the first driving device 7 by the rotation of the recording drum 1, and the rotation of the recording drum 1 is then stopped. In addition, the squeegee roller 58 is brought into close contact with the plate 100 on the outer peripheral surface of the recording drum 1 by the squeegee driving motor 54. Then, the clamp arm 6 swings to the terminal position, shown in FIG. 16, by the clamp arm driving motor 50.

As shown in FIG. 10, the driving pin 75 of the first driving device 7 is inserted into the engaging hole 32a of the engaging member 32 in the rear end clamp 3, and the holding pins 76 are inserted into the holding holes 40 of the rear end clamp 3, so that the driving pin 75, together with the clamp bolt connecting plate 31, slides by the clamp bolt driving motor 71, and the second clamp bolts 34 rotate. Consequently, the second clamp bolts 34 are released from the clamp groove 11 of the recording drum 1. Simultaneously, the holding pins 76 of the first driving device 7 move to the narrow parts of the holding holes 40 of the rear end clamp 3. Consequently, the rear end clamp 3 is held by the first driving device 7.

In this state, when the clamp arm 6 swings to the origin position by the clamp arm driving motor 50, the rear end clamp 3 is lifted up in a state where it is held by the first driving device 7, to open the rear end of the plate 100, as shown in FIG. 15.

Furthermore, the plate 100 is carried outward by the conveying unit 9 shown in FIG. 2 while the recording drum 1 is being rotated in the opposite direction to the direction shown in FIG. 14.

Figure 18:
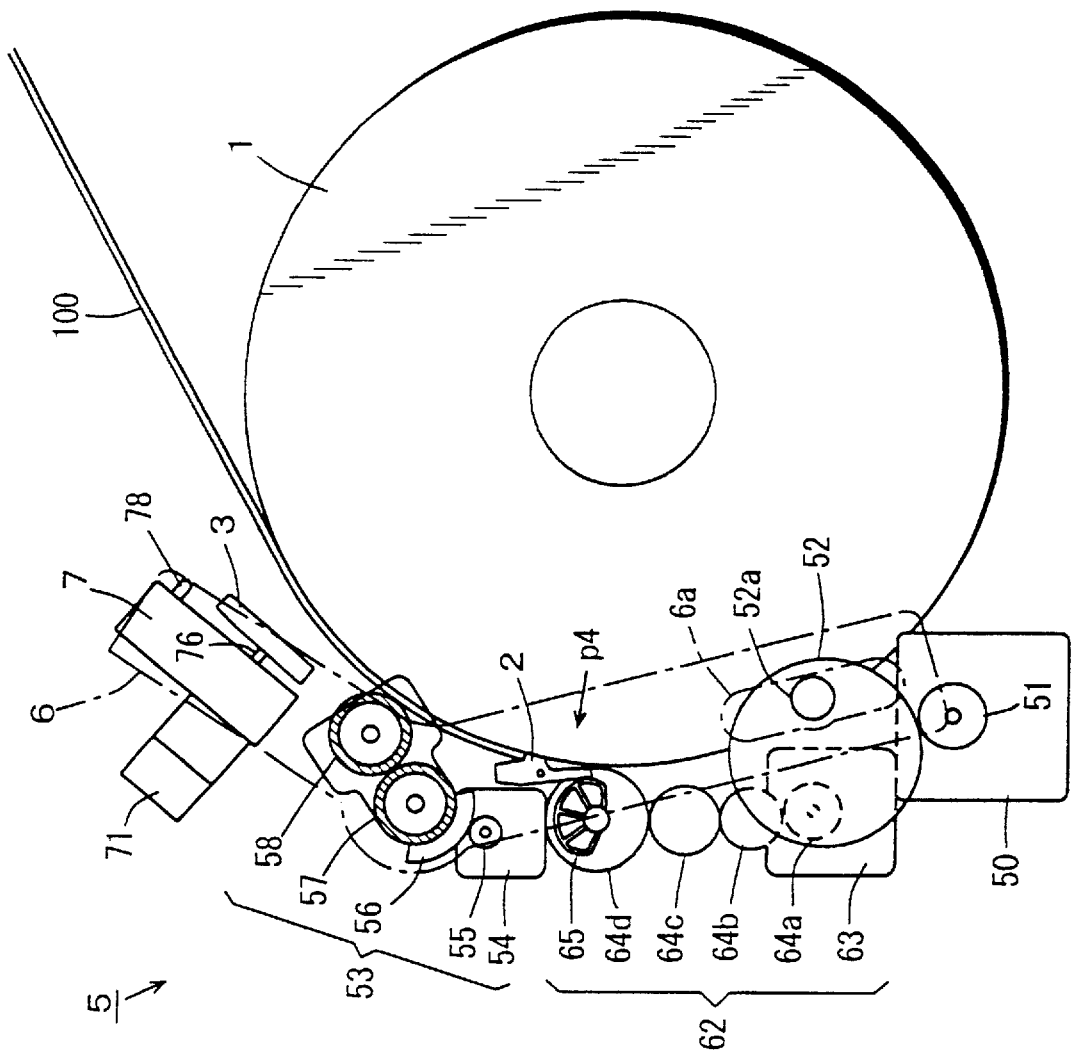
FIG. 18 is a side view showing the operation of the clamp driving device shown in FIG. 11.

When the front end clamp 2 reaches a position p4 of the cam 65 by the rotation of the recording drum 1, as shown in FIG. 18, the rotation of the recording drum 1 is stopped. In this state, the cam 65 rotates by the cam driving motor 63, to press the one side part of the front end clamp 2. Consequently, the front end of the plate 100 is released from the front end clamp 2.

In addition, the squeegee roller 58 is separated from the outer peripheral surface of the recording drum 1 by the squeegee driving motor 54. In this case, the squeegee roller 58 also separates from the gum roller 57. Thereafter, the plate 100 is carried outward through the second conveying path 92 in the conveying unit 9.

FIGS. 19(a) and 19(b) are cross-sectional views showing another example of the rear end clamp 3. As shown in FIGS. 19(a) and 19(b), an inner flange portion 13 projecting inward is provided at an upper end on one side surface of the clamp groove 11 formed in the recording drum 1. A second clamp bolt 34 in the rear end clamp 3 has a projection portion 34a projecting toward its one side part provided on its outer peripheral surface. The construction of the other portions in the rear end clamp 3 shown in FIGS. 19(a) and 19(b) is the same as the construction of the rear end clamp shown in FIGS. 6 to 8.

When the projection portion 34a of the second clamp bolt 34 is positioned parallel to the clamp groove 11, as shown in FIG. 19(a), the projection portion 34a is not engaged with the inner flange portion 13 of the clamp groove 11. In this case, the rear end clamp 3 can be detached from the recording drum 1. On the other hand, when the projection portion 34a of the second clamp bolt 34 is positioned perpendicularly to the clamp groove 11 of the recording drum 1, as shown in FIG. 19(b), the projection portion 34a is engaged with the inner flange portion 13 of the clamp groove 11. Consequently, the rear end clamp 3 is fixed to the recording drum 1.

Figure 19:
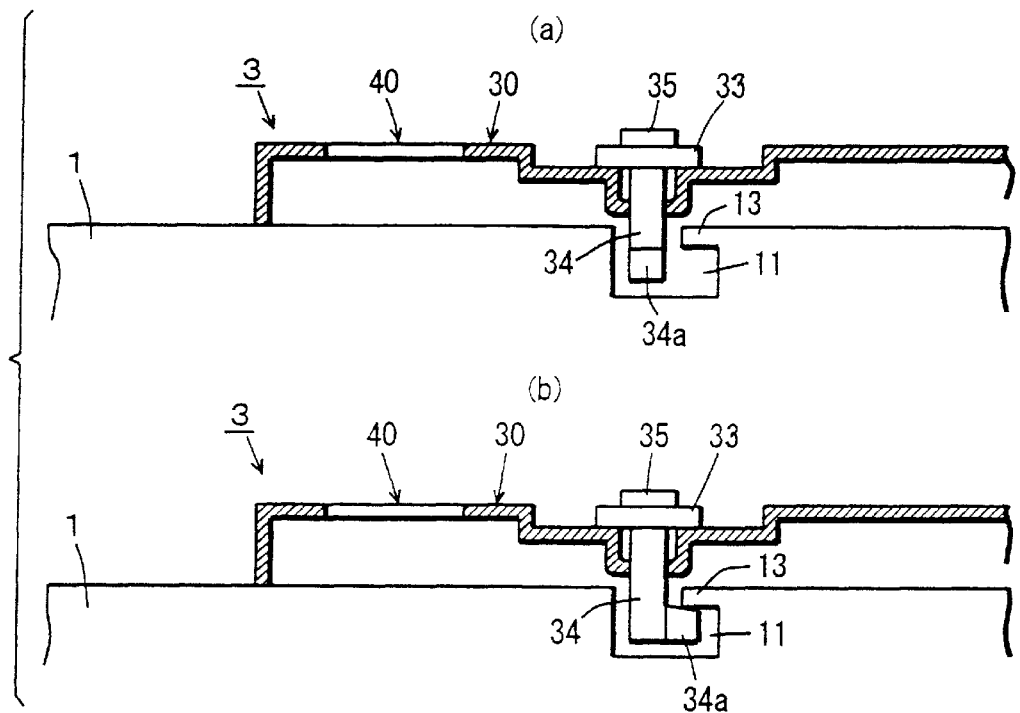
FIGS. 19(a) and 19(b) are cross-sectional views showing another example of the rear end clamp.

When the rear end clamp 3 shown in FIG. 19 is used, the rear end of the plate 100 can be reliably fixed to the outer peripheral surface of the recording drum 1 even when the recording drum 1 is rotated at high speed, as in a case where the rear end clamp 3 shown in FIGS. 6 to 8 is used.

FIGS. 20(a) and 20(b) are cross-sectional views showing still another example of the rear end clamp 3. As shown in FIGS. 20(a) and 20(b), the clamp groove 11 formed in the recording drum 1 has a rectangular cross section. An elliptical projection portion 34b is provided at a lower end of the second clamp bolt 34. The construction of the other portions in the rear end clamps 3 shown in FIGS. 20(a) and 20(b) is the same as the construction of the rear end clamp 3 shown in FIGS. 6 to 8.

When the projection portion 34b of the second clamp bolt 34 is positioned parallel to the clamp groove 11, as shown in FIG. 20(a), the rear end clamp 3 can be detached from the recording drum 1. On the other hand, when the projection portion 34b of the second clamp bolt 34 is positioned perpendicularly to the clamp groove 11 of the recording drum 1, as shown in FIG. 20(b), both ends of the projection portion 34b are pressed against side surfaces of the clamp groove 11. Consequently, the rear end clamp 3 is fixed to the recording drum 1.

Figure 20:
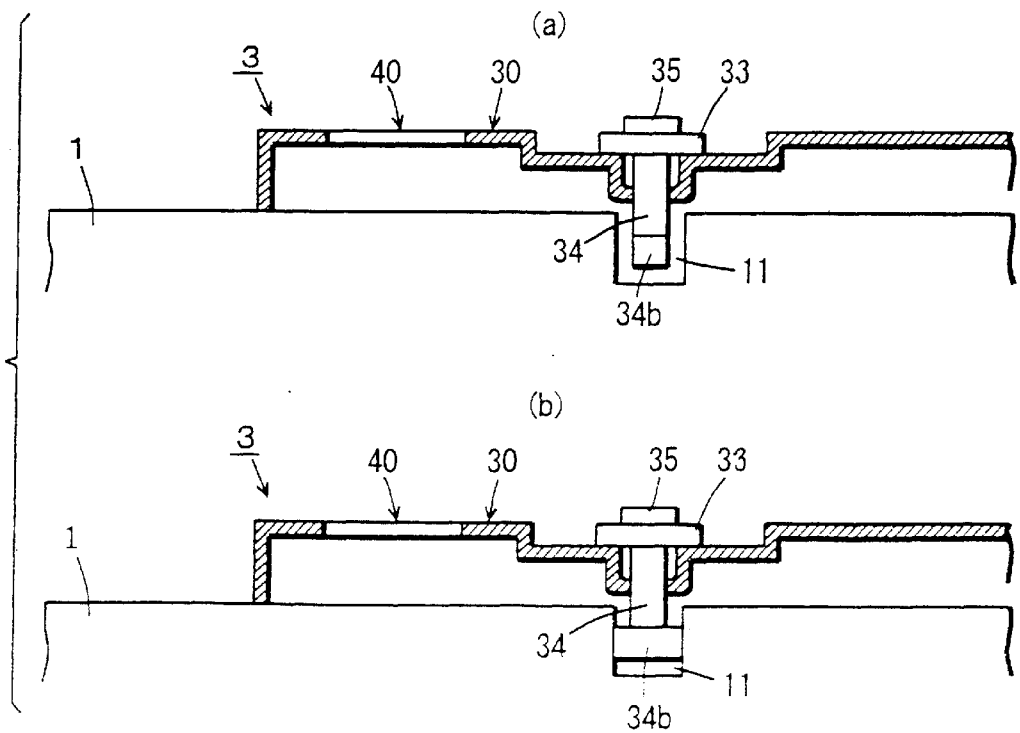
FIGS. 20(a) and 20(b) are cross-sectional views showing still another example of the rear end clamp.

When the rear end clamp 3 shown in FIG. 20 is used, the rear end of the plate 100 can be reliably fixed to the outer peripheral surface of the recording drum 1 even when the recording drum 1 is rotated at high speed, as in a case where the rear end clamp 3 shown in FIGS. 6 to 8 is used.

As described in the foregoing, in the drawing apparatus according to the present embodiment, the plate 100 of arbitrary size can be reliably fixed to the outer peripheral surface of the recording drum 1 by the front end clamps 2 and the rear end clamps 3, so that the plate 100 is not shifted in position and detached even when the recording drum 1 is rotated at high speed.

In addition, the fixing of the front end of the plate 100 by the front end clamps 2 and the fixing and the release of the rear end of the plate 100 by the rear end clamps 3 can be easily performed using the first driving devices 7 in the clamps driving device 5. Further, the release of the front end clamps 2 can be easily performed using the second driving devices 62 in the clamp driving device 5.

In addition, the plate 100 can be uniformly brought into close contact with the outer peripheral surface of the recording drum 1 by the squeegee device 53, and the dust or the like adhering to the surface of the plate 100 can be transferred to the gum roller 57 through the squeegee roller 58. Moreover, when the squeegee roller 58 is spaced apart from the outer peripheral surface of the recording drum 1, the squeegee roller 58 is also spaced apart from the gum roller 57. Accordingly, the dust or the like which has been transferred to the gum roller 57 is prevented from being transferred again to the squeegee roller 58.

Although in the present embodiment, the rear end clamps 3 are fixed to the outer peripheral surface of the recording drum 1 by the grooves extending in its circumferential direction, the grooves may be replaced with a plurality of recesses formed in its circumferential direction.

Figure 21:
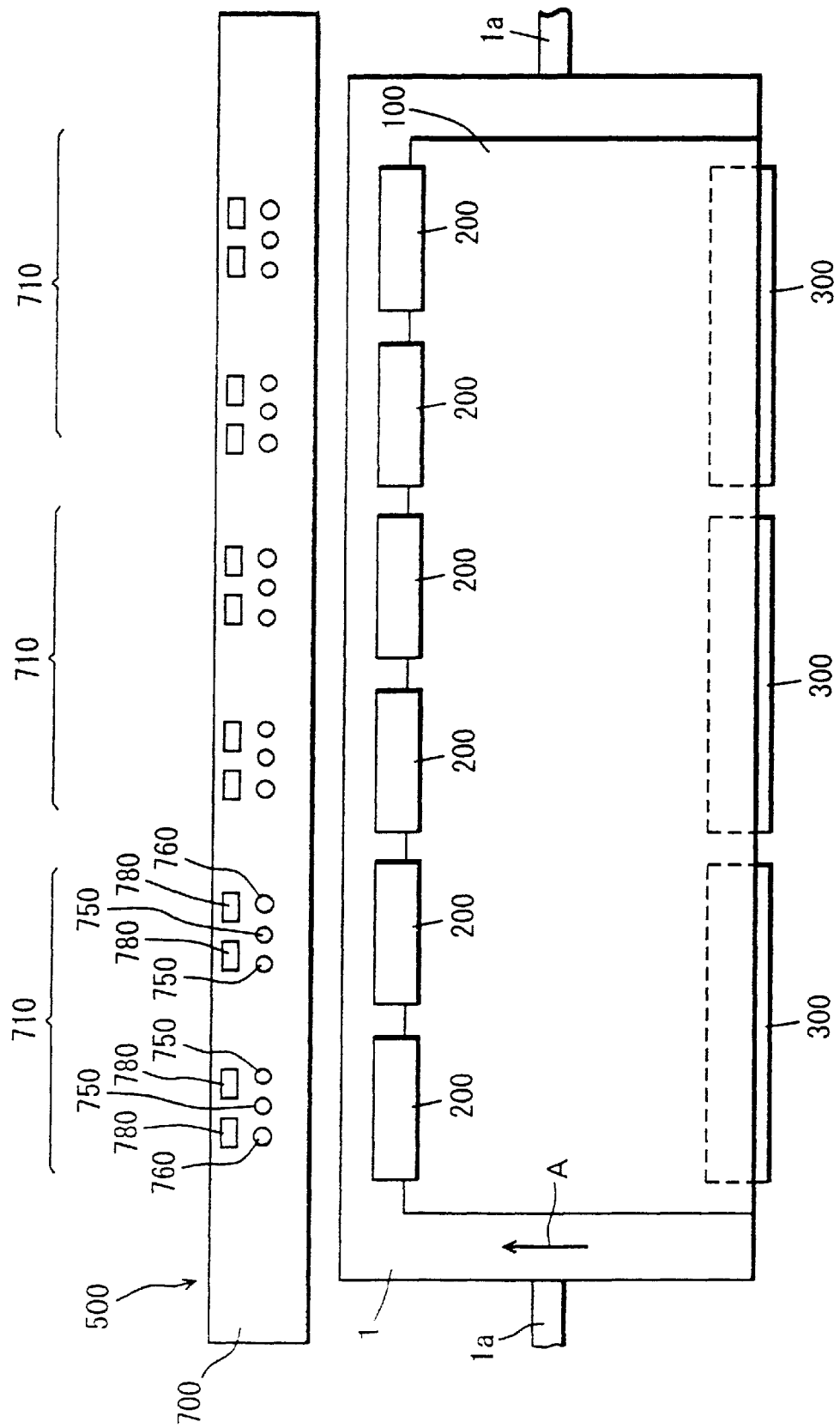
FIG. 21 is a schematic plan view mainly showing a recording drum and a clamp driving device in a drawing apparatus according to another embodiment of the present invention.
Figure 22:
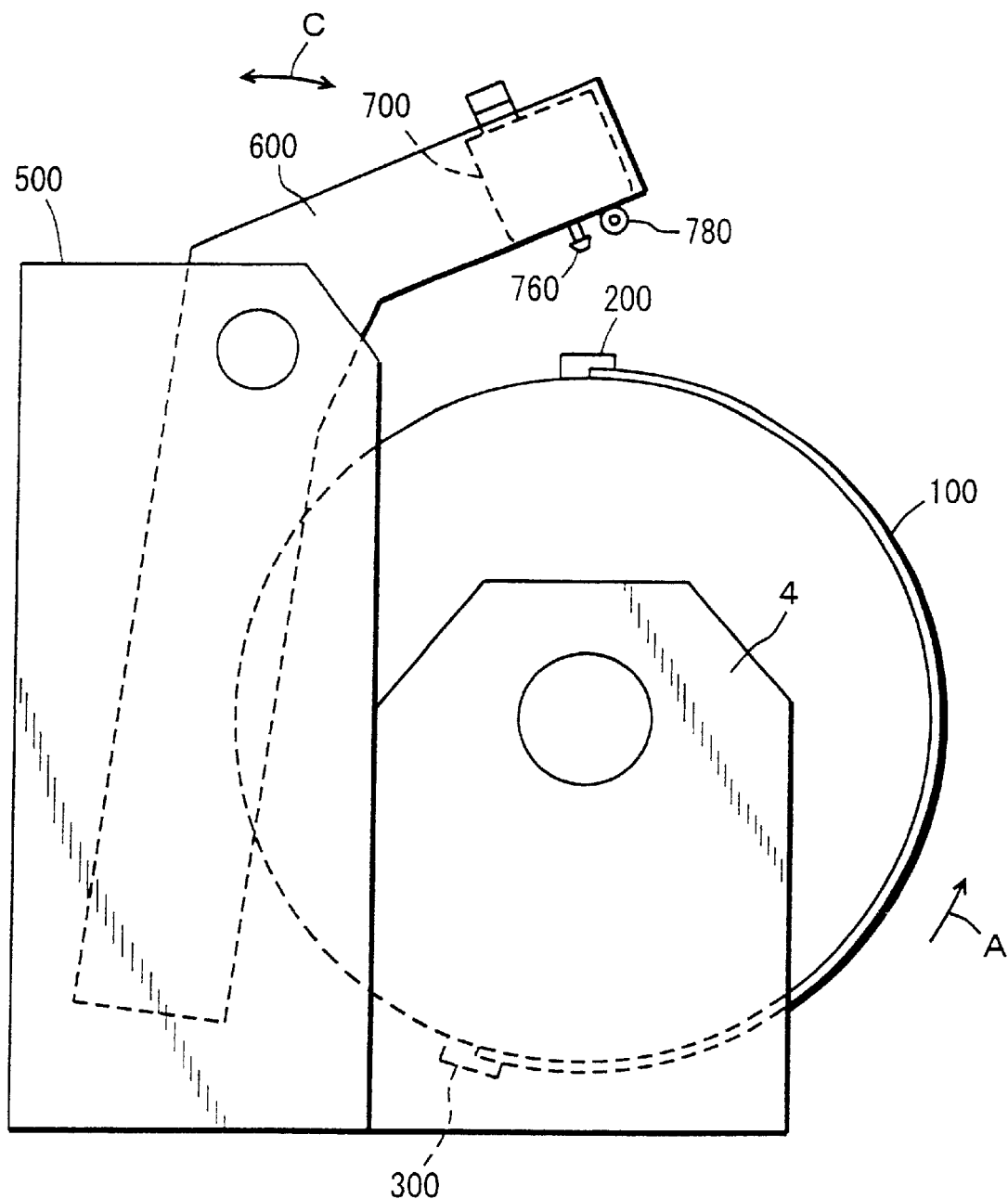
FIG. 22 is a schematic side view of the drawing apparatus shown in FIG. 21.

FIG. 21 is a schematic plan view mainly showing a recording drum and a clamp driving device in a drawing apparatus in a second embodiment of the present invention, and FIG. 22 is a schematic side view of the drawing apparatus shown in FIG. 21.

In FIGS. 21 and 22, the drawing apparatus comprises a cylindrical recording drum 1. The recording drum 1 is rotated in a direction indicted by an arrow A (in a primary scanning direction) around a rotary shaft 1a by a rotation driving device 4 shown in FIG. 22. A plate 100 made of aluminum is mounted as a photosensitive material on an outer peripheral surface of the recording drum 1. One end of the plate 100 is fixed to the outer peripheral surface of the recording drum 1 by a plurality of front end clamps 200, and the other end of the plate 100 is fixed to the outer peripheral surface of the recording drum 1 by a plurality of rear end clamps 300.

As shown in FIG. 22, a clamp driving device 500 is provided behind the recording drum 1. The clamp driving device 500 is used for attaching the rear end clamps 300 to the recording drum 1, detaching the rear end clamps 300 from the recording drum 1, and releasing the front end clamps 200 on the recording drum 1.

The clamp driving device 500 comprises a pair of clamp arms 600 which are swingable in a direction indicated by an arrow C. A driving device 700 is attached between the pair of clamp arms 600. As shown in FIG. 21, the driving device 700 is provided with a plurality of sets of driving mechanisms 710. Each of the sets of driving mechanisms 710 comprises two pairs of driving pins 750, two holding pins 760, and two pairs of pressing rollers 780.

As described later, the two pairs of driving pins 750 are used for attaching the rear end clamp 300 to the recording drum 1 and detaching the rear end clamp 300 from the recording drum 1, and the two holding pins 760 are used for holding the rear end clamp 300. The two pairs of pressing rollers 780 are used for pressing the rear end clamp 300 on the recording drum 1.

The drawing apparatus shown in FIGS. 21 and 22 is also provided with the recording head 8, the conveying unit 9, and the punching device 10 shown in FIGS. 1 and 2.

Figure 23:
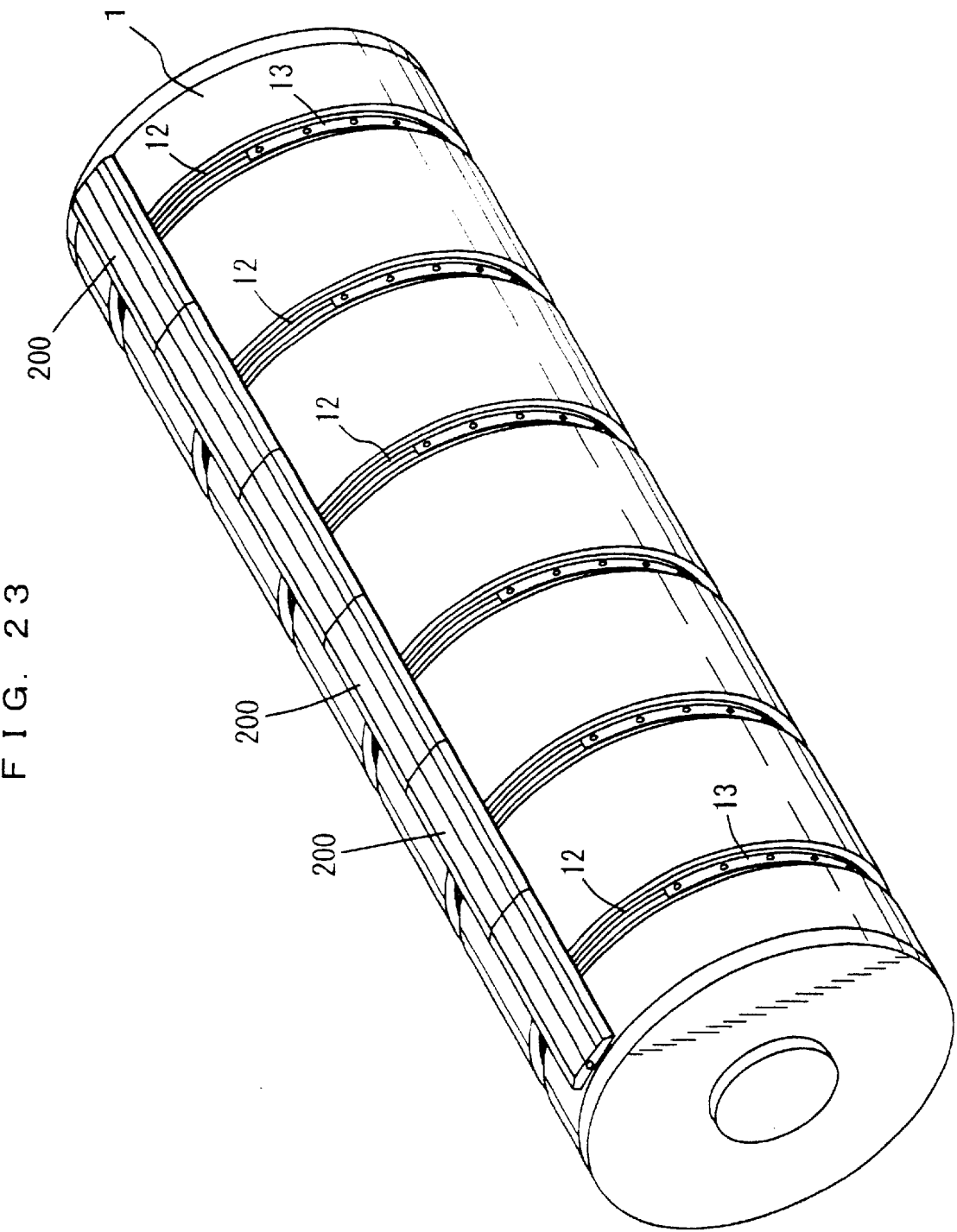
FIG. 23 is a perspective view of a recording drum in the drawing apparatus shown in FIG. 21.

FIG. 23 is a perspective view of the recording drum 1 in the drawing apparatus shown in FIG. 21. As shown in FIG. 23, the recording drum 1 has a plurality of clamp grooves 12 extending in its circumferential direction formed on its outer peripheral surface. A strip-shaped lock plate 13 having a predetermined length is mounted in each clamp groove 12. A plurality of front end clamps 200 are attached to the outer peripheral surface of the recording drum 1. The structure of each front end clamp 200 is the same as the structure of the front end clamp 2 shown in FIGS. 4 and 5.

Figure 24:
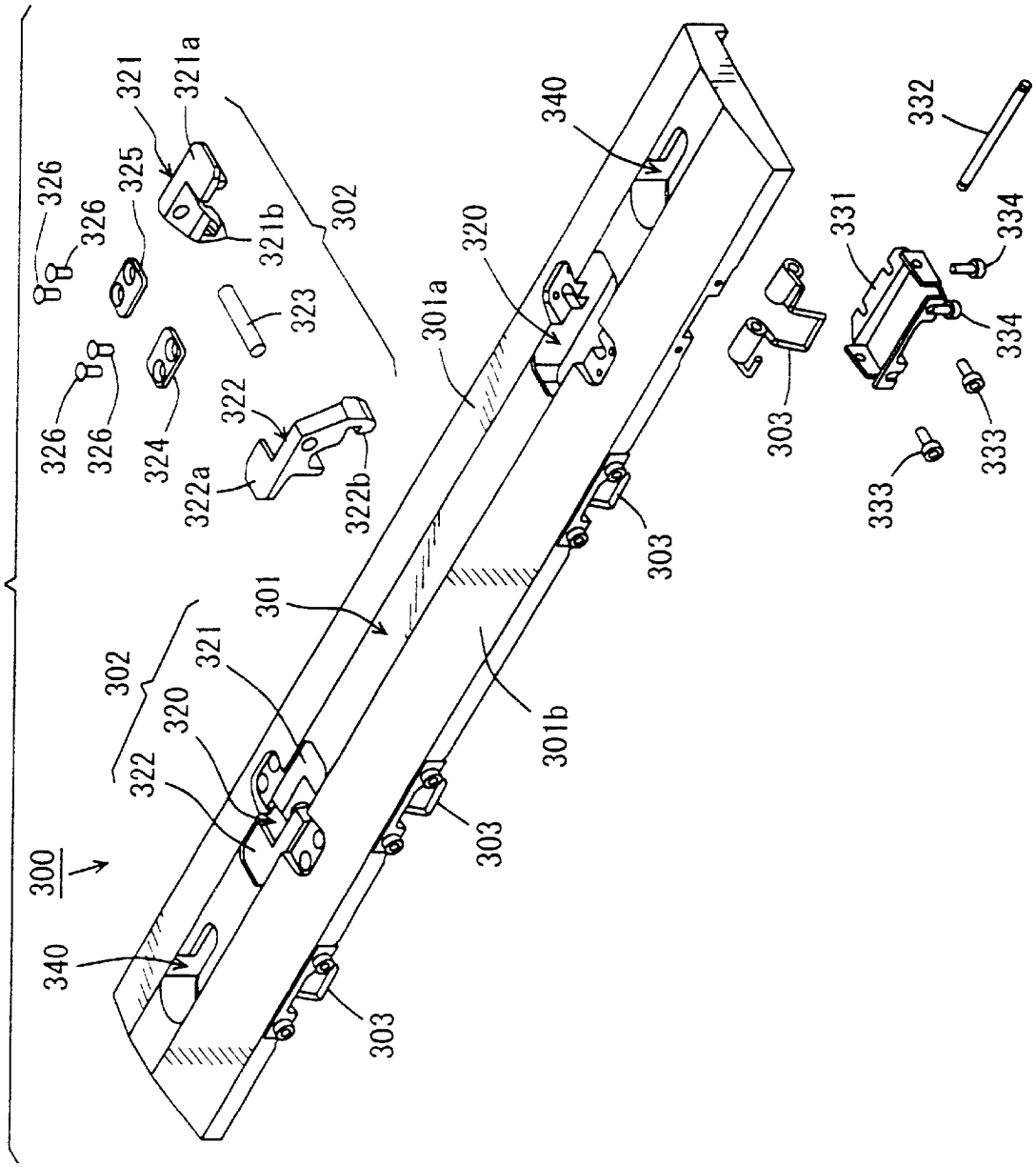
FIG. 24 is an exploded perspective view of the rear end clamp in the drawing apparatus shown in FIG. 21.
Figure 25:
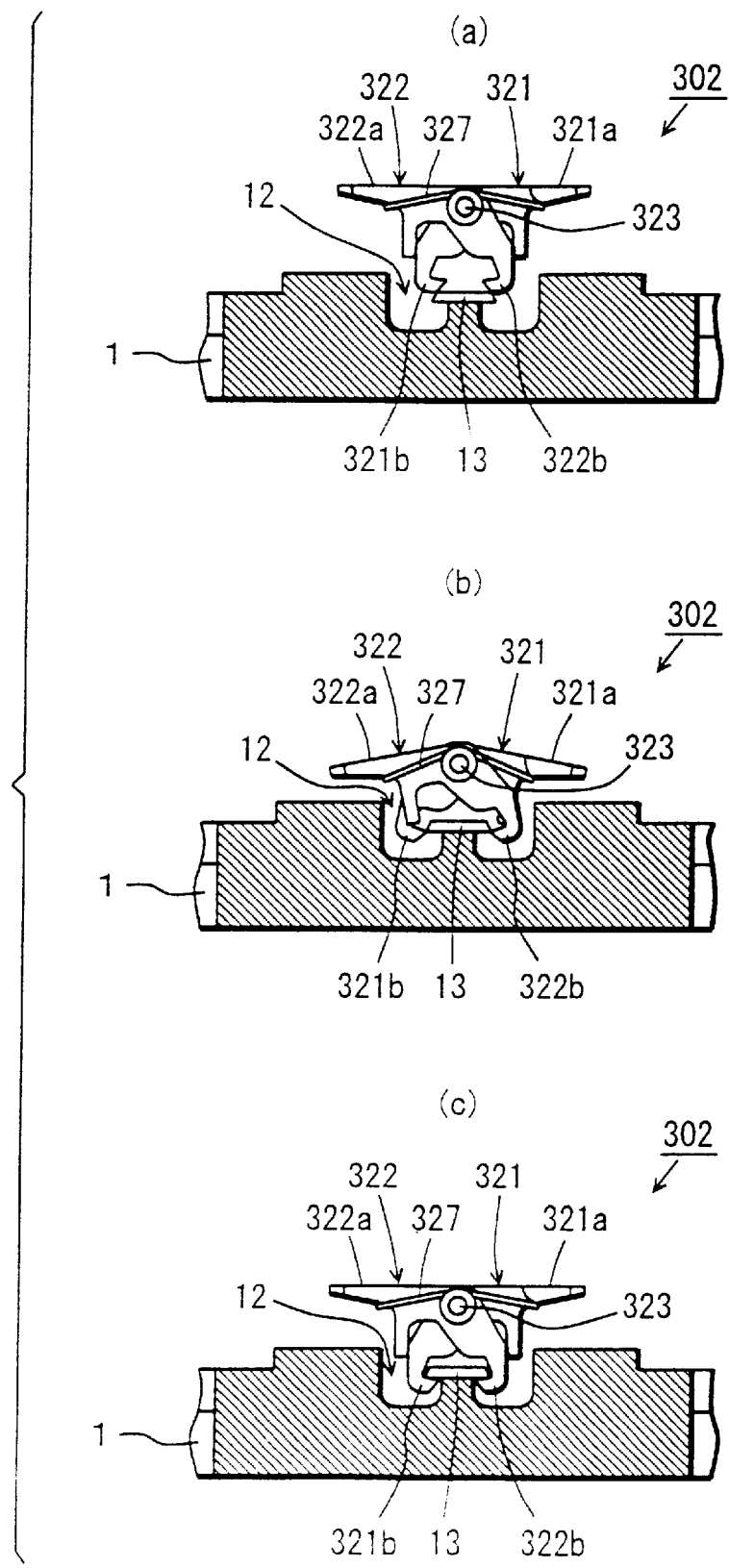
FIGS. 25(a)–25(c) are side views mainly showing a clamping mechanism of the rear end clamp in the drawing apparatus shown in FIG. 21.
Figure 26:
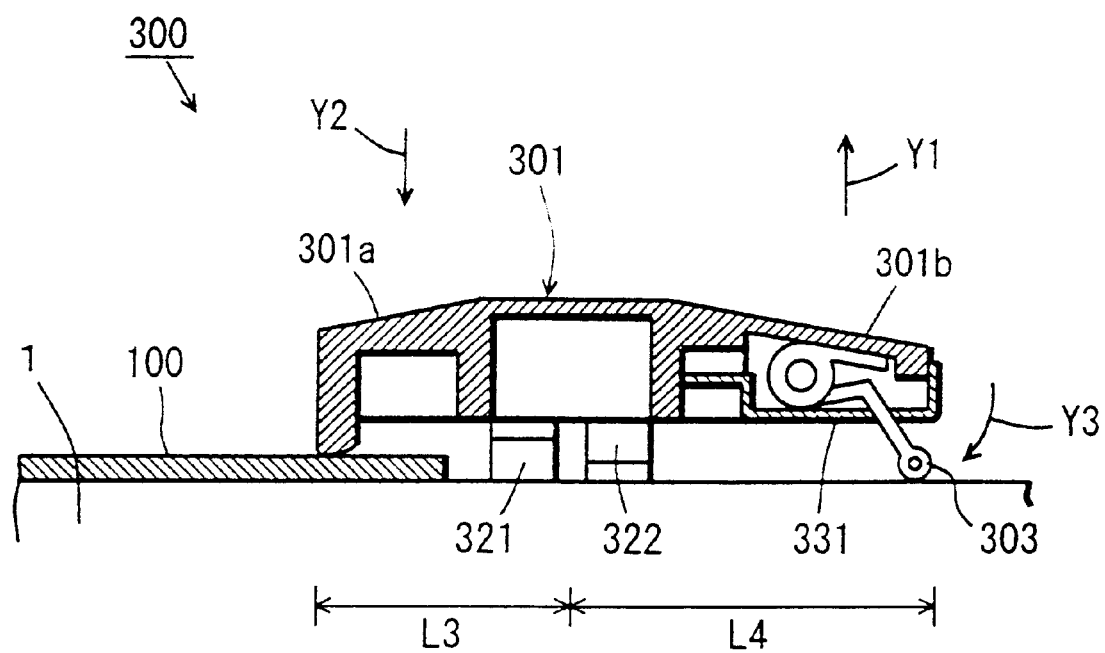
FIG. 26 is a cross-sectional view along the width of the rear end clamp in the drawing apparatus shown in FIG. 21.

FIG. 24 is an exploded perspective view of the rear end clamp 300, FIG. 25 is a side view mainly showing a clamping mechanism of the rear end clamp 300, and FIG. 26 is a cross-sectional view along the width of the rear end clamp 300.

As shown in FIG. 24, the rear end clamp 300 is constituted by a clamp main body 301, a pair of clamping mechanisms 302, and four double torsion springs 303.

The clamp main body 301 is provided with a pair of holes 320. Holding holes 340 are respectively provided in the vicinities of both ends of the clamp main body 301. The holding pins 760 of the driving device 700, described later, are respectively inserted into the holding holds 340.

Each clamping mechanism 302 is constituted by a pair of clamp members 321, 322, a shaft 323, a spring (not shown), a pair of pressing plates 324, 325, and four screws 326. The clamp members 321, 322 respectively have press portions 321a, 322a and hook portions 321b, 322b. The clamp members 321, 322 in each pair are connected to each other so as to be rotatable by the shaft 323, and are mounted in each hole 320 of the clamp main body 301. Each shaft 323 is held in the clamp main body 301 by the pair of pressing plates 324, 325 and the four screws 326.

The four double torsion springs 303 are attached to the rear surface of a side part 301b of the clamp main body 301. Each of the double torsion springs 303 is attached so as to be rotatable in a case 331 by a shaft 332, and the case 331 is fixed to the rear surface of the clamp main body 301 by four screws 333, 334.

As shown in FIGS. 25(a)–25(c), the clamp members 321, 322 in the clamping mechanism 302 are urged in the direction in which the hook portions 321b, 322b are closed inward centered around the shaft 323 by the spring 327. As shown in FIGS. 25(a)–25(c), the clamp groove 12 formed in the recording drum 1 is w-shaped in cross section, and can be formed at low cost by simple lathe forming.

Ends of the press portions 321a, 322a in a pair of clamp members 321, 322 are abutted against the upper surface of the clamp main body 301 from below. Consequently, a space between the hook portions 321b, 322b is slightly narrower than the lock plate 13 in the clamp groove 12 of the recording drum 1, as shown in FIG. 25(a).

When the press portions 321a, 322a in the clamp members 321, 322 are pressed downward by the driving pins 750 in the driving device 700, the hook portions 321b, 322b are opened outward, centered around the shaft 323, against a force produced by the spring 327, as shown in FIG. 25(b). In this state, the hook portions 321b, 322b can pass downward through both sides of the lock plate 13.

Thereafter, as shown in FIG. 25(c), when the clamp main body 301 is pushed downward, and the pressing of the press portions 321a, 322a by the driving pins 750 is released, the hook portions 321b, 322b are closed inward, centered around the shaft 323, by the spring 327. Consequently, the clamp members 321, 322 are engaged with the lock plate 13, and the rear end clamp 300 is fixed to the recording drum 301. Front ends of the hook portions 321b, 322b are firmly engaged with the lock plate 13 by the function of a centrifugal force exerted on the clamping mechanism 302 when the recording drum 1 is rotated at high speed. Therefore, the rear end clamp 300 can be firmly fixed to the recording drum 1.

In addition, in a system of inserting the clamp bolts 33, 34 into the clamp groove 11 and then rotating the clamp bolts, and engaging the projection portions 33a, 34a with the inner flanges of the clamp groove 11, as in the first embodiment, the thickness of the projection portions 33a, 34a (the length, in a direction perpendicular to the clamp groove 11, of the projection portions 33a, 34a before the rotation) is limited to the width of the clamp groove 11. On the other hand, in a system of simply opening or closing the hook portions 321b, 322b rightward or leftward, as in the second embodiment, the thickness of the hook portions 321b, 322b is the length thereof along the clamp groove 12, so that it can be determined irrespective of the width of the clamp groove 12. Therefore, the hook portions 321b, 322b can be caused to have such a thickness that it can withstand a larger clamping force.

As shown in FIG. 26, the one end of the plate 100 is interposed between a lower surface of the one side part 301a of the clamp main body 301 and the outer peripheral surface of the recording drum 1. The double torsion spring 303 is urged in a direction indicated by an arrow Y3.

The other side part 301b of the clamp main body 301 is urged in the direction away from the recording drum 1 centered around a position between the clamp members 321, 322, as indicated by an arrow Y1, by a reaction force produced by the double torsion spring 303. Consequently, a force in the direction in which the one side part 301a of the clamp main body 301 is brought near the recording drum 1, as indicated by an arrow Y2, is exerted, so that the one end of the plate 100 on the recording drum 1 is pressed by the lower surface of the one side part 301a of the clamp main body 301. The lower surface of the one side part 20a of the clamp main body 301 is coated with ceramic. Consequently, the durability is improved without decreasing a frictional force.

The length L3 of the one side part 301a of the clamp main body 301 which is determined on the basis of the position between the clamp members 321, 322 is set to a length smaller than the length L4 of the other side part 301b of the clamp main body 301.

At the time of rotation of the recording drum 1, centrifugal forces are respectively exerted on the one side part 301a and the other side part 301b of the clamp main body 301. Since the length L3 of the one side part 301a of the clamp main body 301 is set to a length smaller than the length L4 of the other side part 301b of the clamp main body 301, a rotation moment generated by the one side part 301a of the clamp main body 301 centered around the position between the clamp members 301, 302 is smaller than a rotation moment generated by the other side part 301b. Consequently, a force in the direction in which the other side part 301b of the clamp main body 301 is separated from the outer peripheral surface of the recording drum 1, so that the one end of the plate 100 is firmly pressed against the outer peripheral surface of the recording drum 1 by the one side part 301a of the clamp main body 301.

The higher the rotational speed of the recording drum 1 is, the larger a force to exert the other side part 301b of the clamp main body 301 is, and the stronger a force for the one side part 301a of the clamp main body 301 to press the one end of the plate 100 against the outer peripheral surface of the recording drum 1 is. Even when the recording drum 1 is rotated at high speed, therefore, the one end of the plate 100 is reliably fixed to the outer peripheral surface of the recording drum 1 by the rear end clamp 300, so that the plate 100 on the outer peripheral surface of the recording drum 1 is not shifted in position and detached.

Figure 27:
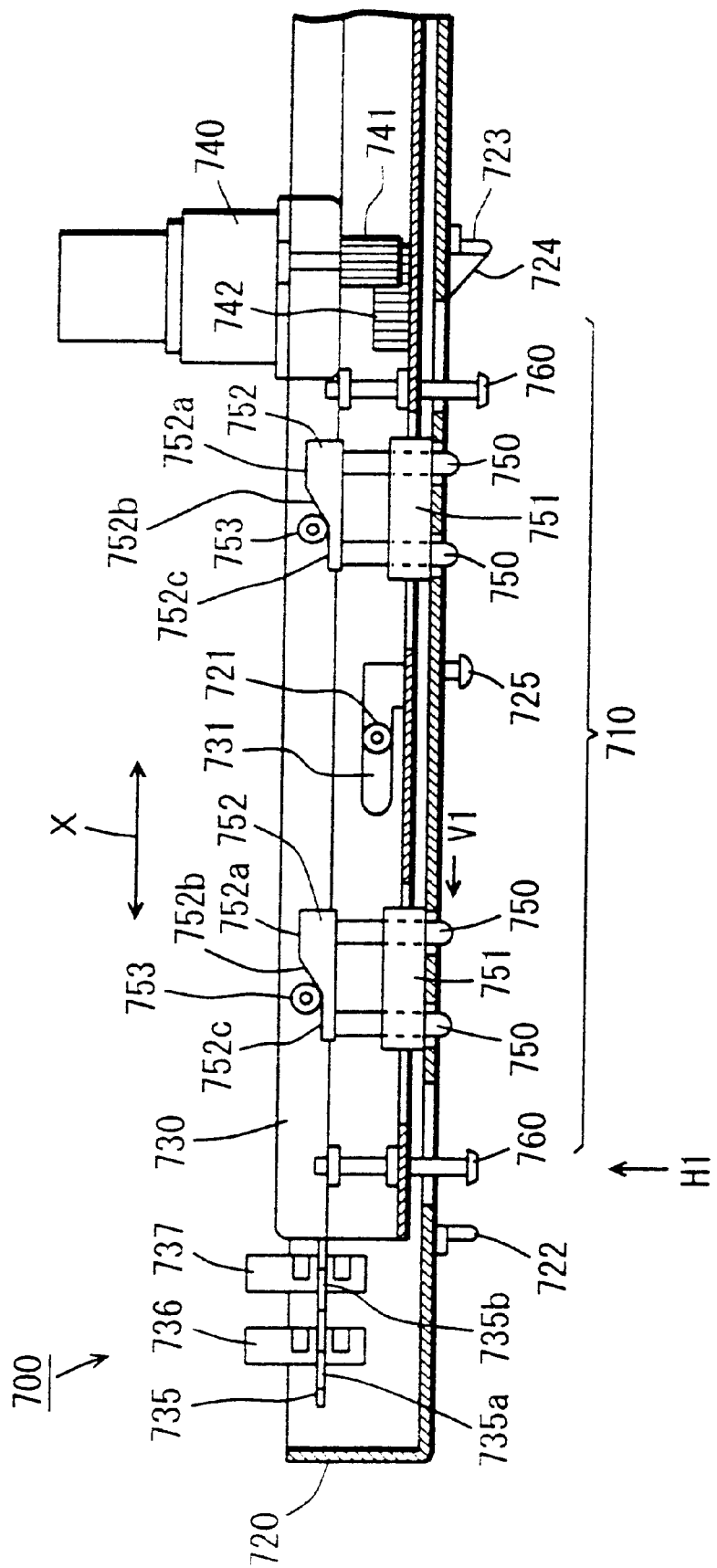
FIG. 27 is a cross-sectional view showing the construction and the operation of a driving device in the drawing apparatus shown in FIG. 21.
Figure 28:
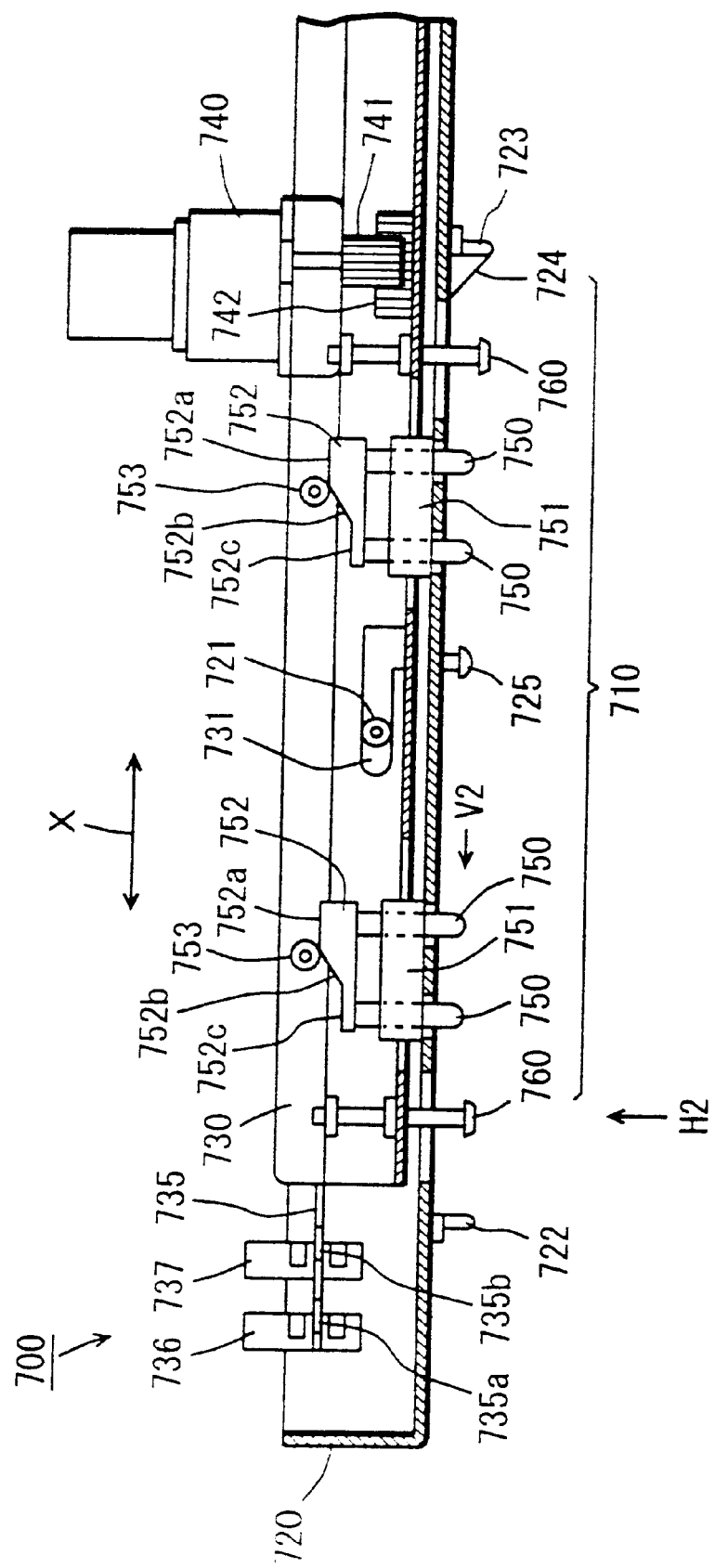
FIG. 28 is a cross-sectional view showing the construction and the operation of a driving device in the drawing apparatus shown in FIG. 21.
Figure 29:
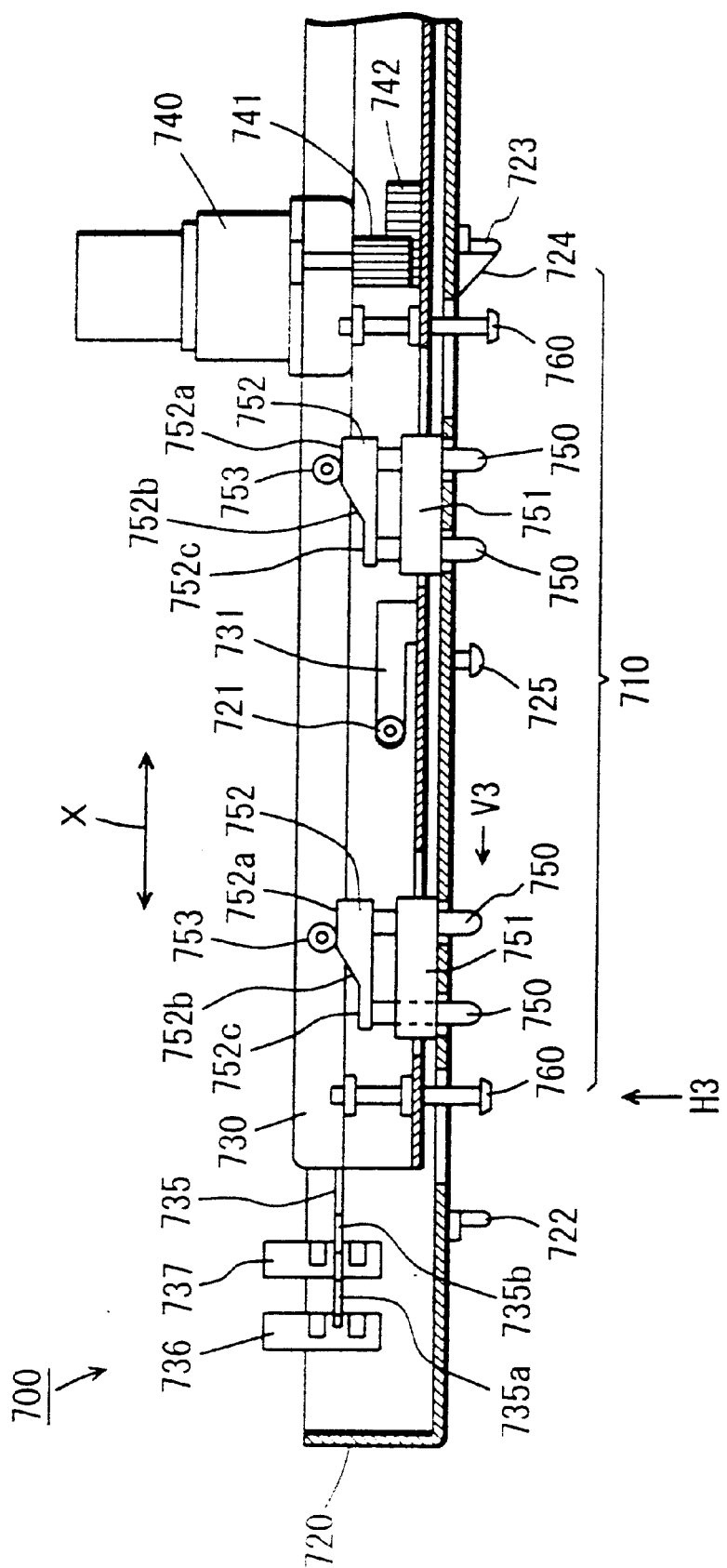
FIG. 29 is a cross-sectional view showing the construction and the operation of a driving device in the drawing apparatus shown in FIG. 21.

FIGS. 27, 28 and 29 are cross-sectional views showing the construction and the operation of a driving device 700. In FIGS. 27 to 29, one set of driving mechanisms 710 is illustrated.

As shown in FIGS. 27 to 29, the driving device 700 comprises a driving stay 720 and a slider 730. A flanged bearing 721 is attached to the driving stay 720. A horizontal slit 731 is formed in the slider 730. The flanged bearing 721 of the driving stay 720 is fitted in the slit 731 of the slider 730.

Further, a slider driving motor 740 is fixed to the driving stay 720. A pinion gear 741 is attached to the slider driving motor 740. The slider 730 is provided with a rack gear 742 which is meshed with the pinion gear 741. The slider 730 is provided so as to be slidable in a direction indicted by an arrow X with respect to the driving stay 720 by the rotation of the slider driving motor 740.

The driving mechanism 710 is constituted by two pairs of driving pins 750, two bearings 751, two cam followers 752, two cams 753, and two holding pins 760.

Each bearing 751 is fixed on the bottom surface of the driving stay 720. One pair of driving pins 750 is respectively provided movably up and down so as to penetrate each bearing 751 and the driving stay 720. Each cam follower 752 is attached to upper ends of one pair of driving pins 750. The upper surface of the cam follower 752 is constituted by an upper horizontal surface 752a, an inclined surface 752b, and a lower horizontal surface 752c. Each cam 753 is attached to the slider 730 so as to be abutted against the upper surface of each cam follower 752. Each pair of driving pins 750 and each cam follower 752 are urged upward by a spring (not shown).

Each holding pin 760 penetrates the bottom surface of the slider 730, and projects downward through a long hole provided on the lower surface of the driving stay 720. Each holding pin 760 is urged downward by a spring (not shown).

Holding members 722, 723 projecting downward are provided on the lower surface of the driving stay 720. A leaf spring 724 is attached to the holding member 723. The rear end clamp 300 shown in FIG. 24 is held between the holding member 722 and the leaf spring 724. In this case, the two holding pins 760 can be respectively inserted into the two holding holes 340 in the rear end clamp 300, and the two pairs of driving pins 750 can be respectively abutted against the press portions 321a, 322a of the clamp members 321, 322 in the two clamping mechanisms 302.

In addition, the pressing pin 725 which is urged downward by a spring (not shown) is provided on the lower surface of the driving stay 720. The pressing pin 725 prevents the rear end clamp 300 held between the holding member 722 and the leaf spring 724 from being lifted.

A position detecting member 735 horizontally projecting is provided at one end of the slider 730. Two tabs 735a, 735b are formed in the position detecting member 735. Two sensors 736, 737 for detecting the tabs 735a, 735b of the position detecting member 735 are provided in the driving stay 720. The position in the horizontal direction of the slider 730 with respect to the driving stay 720 is detected by the sensors 736, 737.

Figure 30:
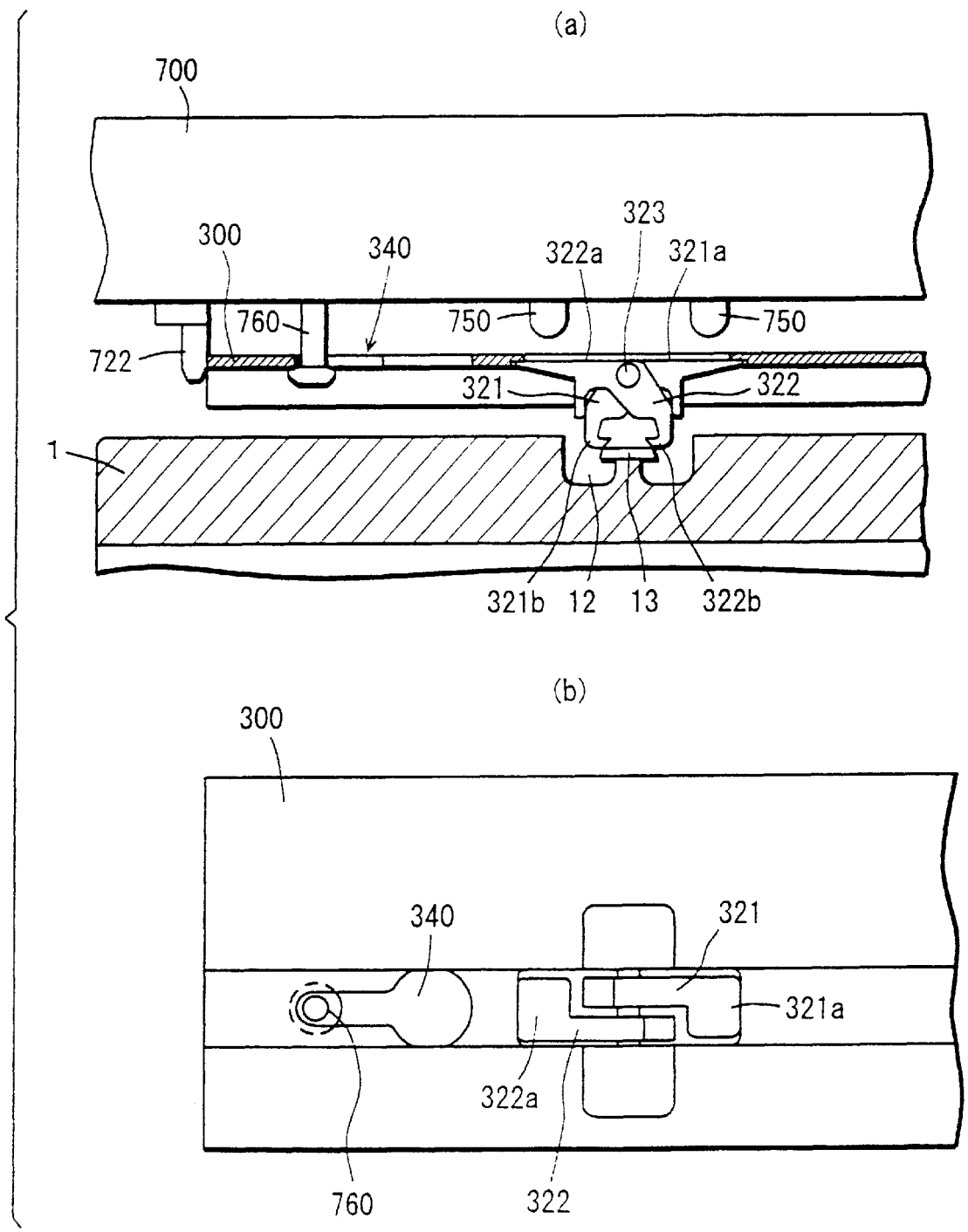
FIG. 30(a) is a cross-sectional view and FIG. 30(b) is plan view showing a state where the rear end clamp is held by the driving device in the drawing apparatus shown in FIG. 21.
Figure 31:
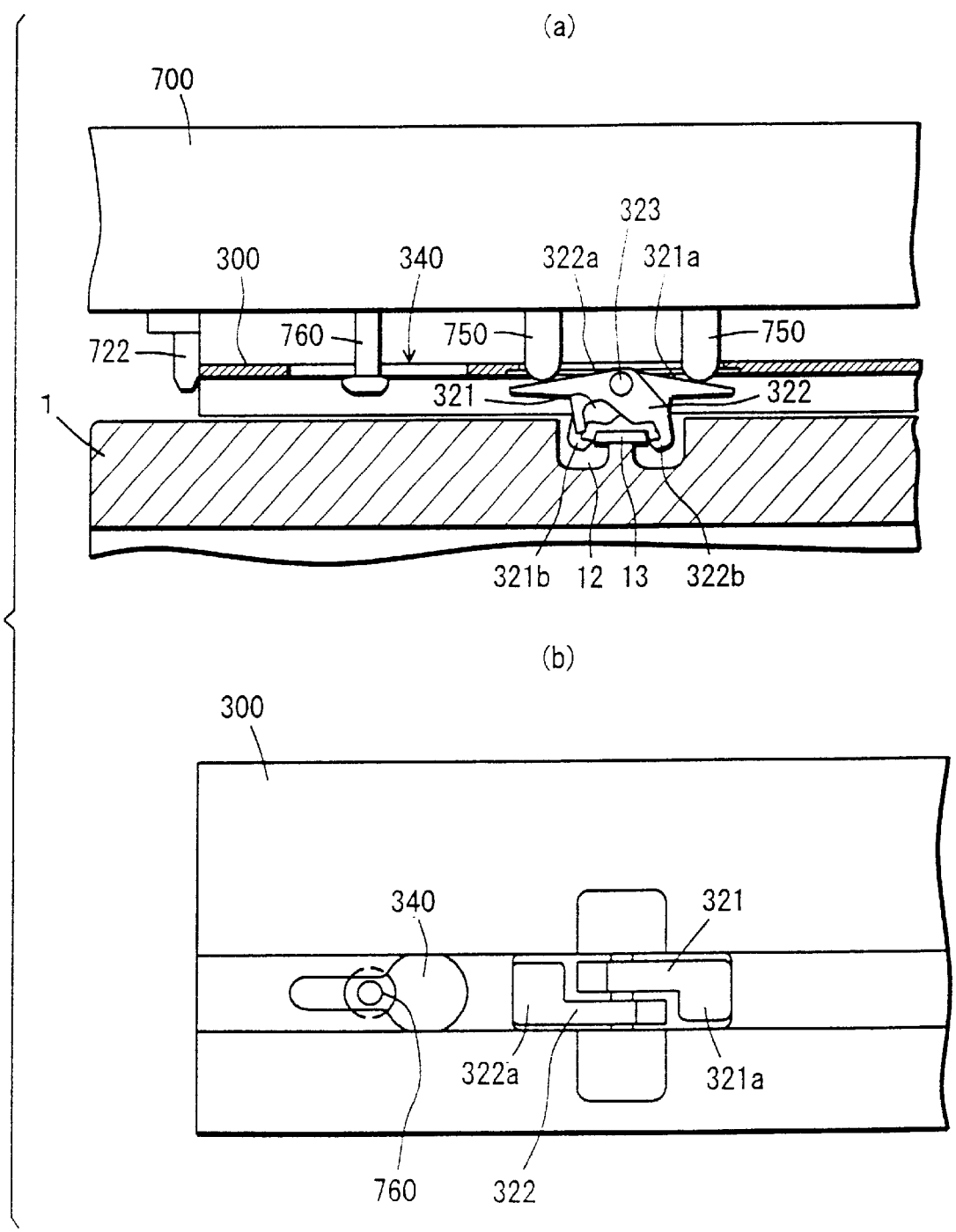
FIG. 31(a) is a cross-sectional view and FIG. 31(b) is a plan view showing a state where a clamping mechanism of the rear end clamp is opened by the driving device in the drawing apparatus shown in FIG. 21.
Figure 32:
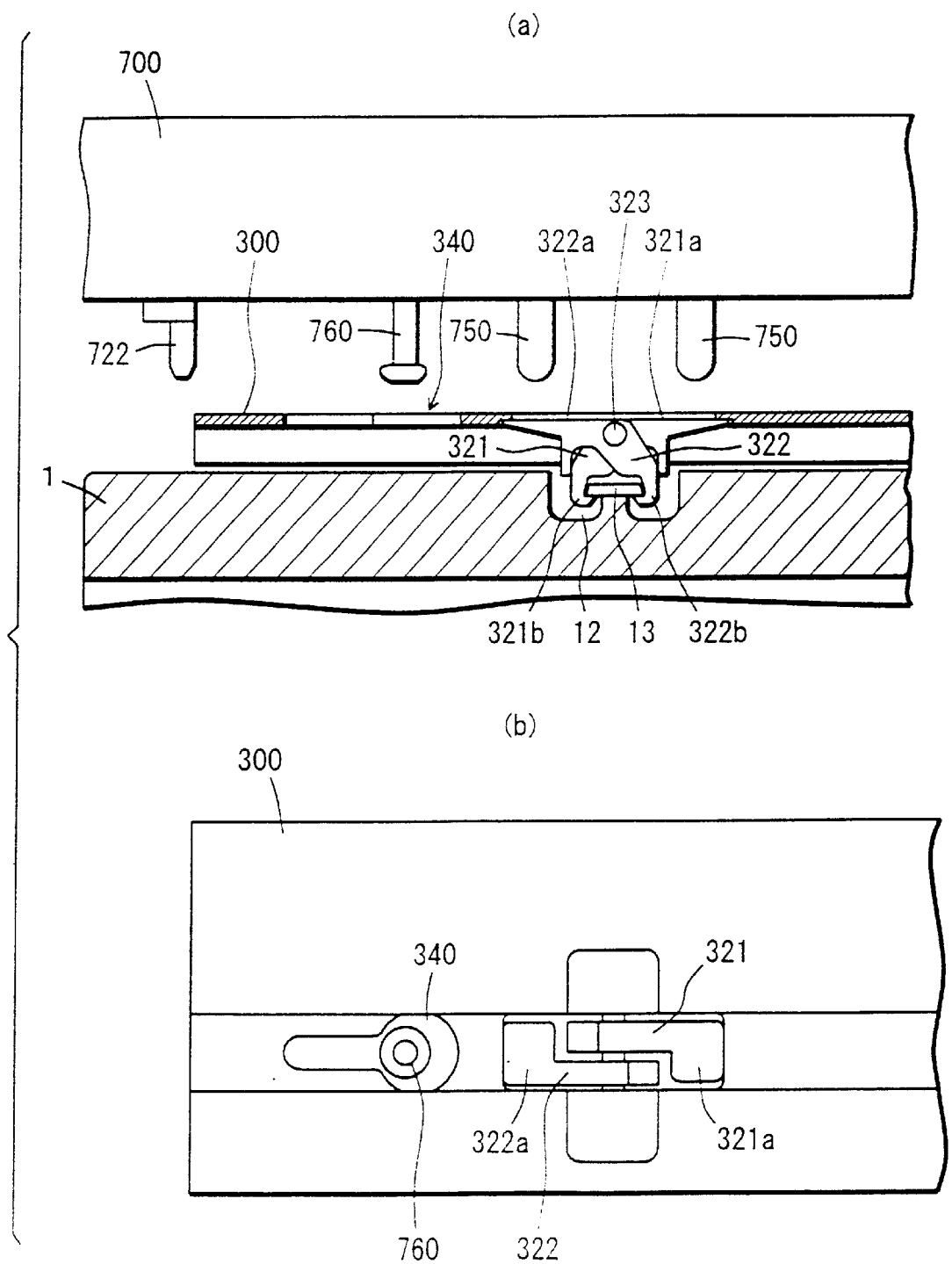
FIG. 32(a) is a cross-sectional view and FIG. 32(b) is a plan view showing a state where the rear end clamp is detached from the driving device in the drawing apparatus shown in FIG. 21.

FIGS. 30(a), 30(b) are respectively a cross-sectional view and a plan view of a state where the rear end clamp 300 is held by the driving device 700. FIGS. 31(a), 31(b) are respectively a cross-sectional view and a plan view of a state where a clamping mechanism of the rear end clamp 300 is opened by the driving device 700. FIGS. 32(a), 32(b) are respectively a cross-sectional view and a plan view of a state where the rear end clamp 300 is detached from the driving device 700. The operations of the driving device 700 and the rear end clamp 300 will be described while referring to FIGS. 27 to 32.

When the cam 753 in the slider 730 is positioned in the vicinity of a lower end of the inclined surface 752b of the cam follower 752, as shown in FIG. 27, front ends of the driving pins 750 are at a first vertical position V1, and the holding pin 760 is at a first horizontal position H1.

In this case, the driving pins 750 are not abutted against the press portions 321a, 322a of the clamp members 321, 322, as shown in FIG. 30. Consequently, the hook portions 321b, 322b of the clamp members 321, 322 are in a closed state. In addition, the holding pin 760 is positioned in a narrow part of the holding hole 340 in the rear end clamp 300. Consequently, the rear end clamp 300 is held by the holding pin 760.

When the slider 730 slides in the horizontal direction by the slider driving motor 740 so that the cam 753 is positioned in the vicinity of an upper end of the inclined surface of the cam follower 752, as shown in FIG. 28, the front ends of the driving pins 750 are lowered to a second vertical position V2, and the holding pin 760 moves to a second horizontal position H2.

In this case, the press portions 321a, 322a of the clamp members 321, 322 are pushed down by the driving pins 750, as shown in FIG. 31. Consequently, the hook portions 321b, 322b are opened outward, to pass through both sides of the lock plate 13 in the clamp groove 12. Further, the holding pin 760 moves to the vicinity of a boundary between the narrow part and the circular part of the holding hole 340 in the rear end clamp 300.

When the slider 730 further slides in the horizontal direction by the slider driving motor 740 so that the cam 753 is positioned on the upper horizontal surface 752a of the cam follower 752, as shown in FIG. 29, the front ends of the driving pins 750 are pushed down to a third vertical position V3, and the holding pin 760 moves to a third horizontal position H3.

In this case, the holding pin 760 moves to the circular part of the holding hole 340 in the rear end clamp 300, as shown in FIG. 32. When the driving device 700 is moved upward, the holding pin 760 is detached from the rear end clamp 300, and the pressing of the press portions 321a, 322a of the clamp members 321, 322 by the driving pins 750 is released. Consequently, the hook portions 321b, 322b of the clamp members 321, 322 are closed inward, and are engaged with the lock plate 13 in the clamp groove 12.

In the above-mentioned manner, the rear end clamp 300 can be attached to the recording drum 1, and the rear end clamp 300 can be detached from the driving device 700.

By operations reverse to the above-mentioned operations, the rear end clamp 300 can be detached from the recording drum 1, and the rear end clamp 300 can be held in the driving device 700.

The construction of the other portions and the overall operation of the clamp driving device 500 in FIG. 22 are the same as the construction and the operation of the clamp driving device 5 described using FIGS. 11 to 18.

As described in the foregoing, in the drawing apparatus of the present embodiment, the plate 100 of arbitrary size can be reliably fixed on the outer peripheral surface of the recording drum 1 by the front end clamps 200 and the rear end clamps 300, so that the plate 100 is not shifted in position and detached even when the recording drum 1 is rotated at high speed.

In addition, the fixing of the front end of the plate 100 by the front end clamps 200 and the fixing and the release of the rear end of the plate 100 by the rear end clamps 300 can be easily performed using the driving device 700 in the clamp driving device 500.

Figure 33:
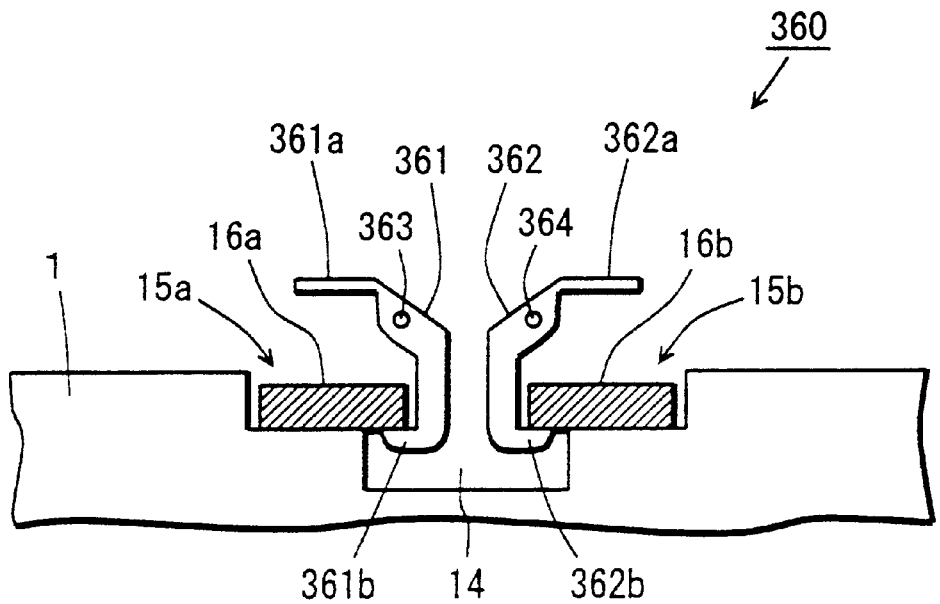
FIG. 33 is a schematic sectional view showing another example of the clamping mechanism of the rear end clamp in the drawing apparatus shown in FIG. 21.
Figure 34:
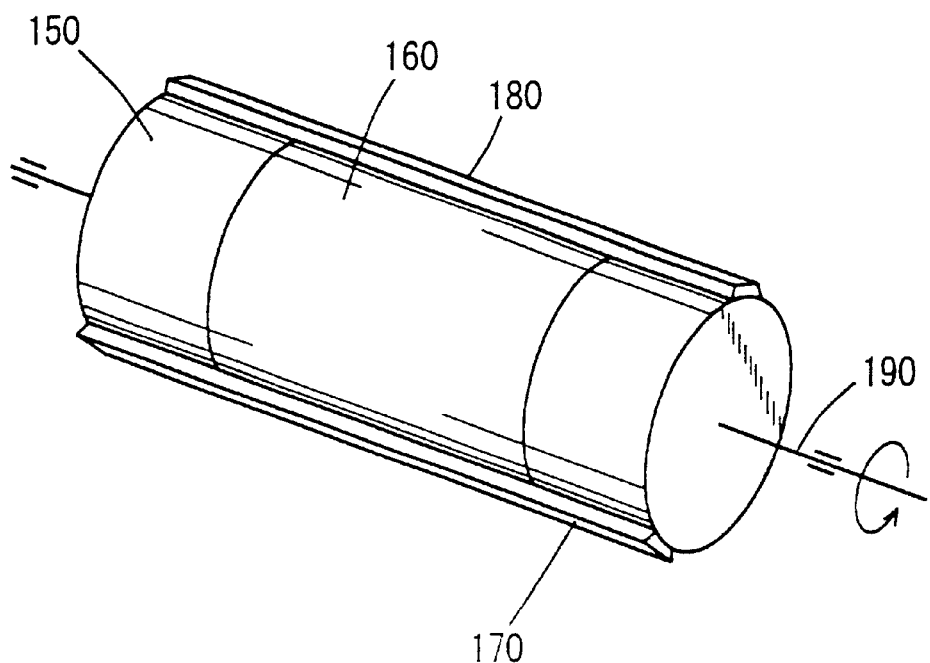
FIG. 34 is a perspective view of a recording drum in a conventional drawings apparatus.

FIG. 33 is a schematic cross-sectional view showing another example of a clamping mechanism of the rear end clamp 300.

As shown in FIG. 33, recesses 15a, 15b are formed on both sides of a clamp groove 14 in a recording drum 1, and strip-shaped lock plates 16a, 16b are respectively attached on the recesses 15a, 15b. A clamping mechanism 360 comprises a pair of clamping members 361, 362. The clamp members 361, 362 respectively have press portions 361a, 362a and hook portions 361b, 362b.

The clamp members 361, 362 are respectively provided in the clamp main body so as to be rotatable by the shafts 363, 364, and are urged outward by a spring (not shown). Consequently, the hook portions 361b, 362b are respectively engaged with the lock plates 16a, 16b in the clamp groove 14. When the press portions 361a, 362a are pushed down by the driving pins 750 of the driving device 700, the engagement between the hook portions 361b, 362b and the lock plates 16a, 16b is released.

Although in the above-mentioned embodiment, the clamp groove 12 extending over the whole circumference of the outer peripheral surface of the recording drum 1 are provided, the clamp grooves 12 may be provided in a part, in the circumferential direction, of the outer peripheral surface of the recording drum 1. Alternatively, the clamp grooves 12 may be intermittently provided in the circumferential direction of the outer peripheral surface of the recording drum 1.

Although in the above-mentioned embodiment, a front end clamp and a rear end clamp are divided into a plurality of parts, they may have single structures, in which case the same function can be performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A drawing apparatus for drawing an image on a sheet-shaped recording material, comprising:

a cylindrical drum having a rotary shaft and an outer peripheral surface and having a groove extending in the circumferential direction provided on said outer peripheral surface;

a rotation driving device for rotating said drum around said rotary shaft;

a fixing member provided so as to be attachable and detachable to or from said groove of said drum and so as to be movable along said groove for fixing the recording material to the outer peripheral surface of said drum; and a drawing unit for drawing the image on the recording material fixed on the outer peripheral surface of said drum, said fixing member comprising:

a main body member having one side part and an other side part, the one side part for pressing one end of the recording material against the outer peripheral surface of said drum, and an engaging member provided so as to project on the side of a lower surface of said main body member and engaged with the inside of said groove of said drum, said drawing apparatus further comprising:

a fixing member driving device for operating said engaging member of said fixing member to fix said fixing member to said drum or release said fixing member from said drum while holding said fixing member in a state where said engaging member of said fixing member is released from said groove of said drum, wherein said engaging member of said fixing member comprises at least one lock member having a press portion and a lock portion, said lock portion being insertable into said groove of said drum as said press portion is pressed, while being locked into said groove by releasing the pressing of said press portion.

2. The drawing apparatus according to claim 1, wherein said fixing member further includes urging means for urging the other side part of said main body member in the direction apart from said outer peripheral surface of said drum.

3. The drawing apparatus according to claim 2, wherein said fixing member driving device comprises a driving member for pressing said press portion of said at least one lock member of the fixing member, and
- a driving member driving mechanism for moving said driving member toward said press portion of said at least one lock member.

4. The drawing apparatus according to claim 3, wherein said fixing member driving device comprises a supporting member, and
- a sliding member provided so as to be slidable in a predetermined direction with respect to said supporting member for moving said driving member toward said press portion of said at least one lock member as said sliding member slides.

5. The drawing apparatus according to claim 4, wherein said fixing member driving device further comprises a holding member for holding or releasing said main body member of said fixing member as said sliding member slides.

6. The drawing apparatus according to claim 2, wherein said at least one lock member comprises:
- first and second lock members each having said press portion and said lock portion,
- a shaft for connecting said first and second lock members to each other so as to be rotatable, and
- a spring member for urging said first and second lock members in the direction in which said lock portion of each of said first and second lock members is locked into said groove of said drum,
- said first and second lock members being provided such that the locking of said lock portion in said groove is released by pressing of said press portion.

7. The drawing apparatus according to claim 6, further comprising a strip-shaped lock plate provided in said groove of said drum,
- said spring member urging said first and second lock members in the direction in which said lock portion of each of said first and second lock members is locked into said lock plate, and
- said first and second lock members being provided such that the locking of said lock portion by said lock plate is released by the pressing of said press portion.

8. The drawing apparatus according to claim 2, wherein said engaging member includes:
- first and second lock members having press portions, lock portions and rotary shafts, and
- a spring member for urging said first and second lock members in such a direction that respective said lock portions of said first and second lock members are locked in said groove of said drum,
- said engaging member is held on said main body member through pivotal support by respective said rotary shafts of said first and second lock members, and
- said first and second lock members are so provided as to release said lock portions from locking in said groove through pressing by said press portions.

9. The drawing apparatus according to claim 8, further comprising at least two strip-shaped lock plates provided in said groove of said drum, wherein
- said spring member urges said first and second lock members in a direction for locking respective said lock portions of said first and second lock members in one of said lock plates, and
- said first and second lock members are so provided that said lock portions are released from locking by said lock plates through pressing by said press portions.

10. A drawing apparatus for drawing an image on a sheet-shaped recording material, comprising:
- a cylindrical drum having a rotary shaft and an outer peripheral surface with recess parts intermittently formed on said outer peripheral surface in the circumferential direction of said drum;
- a rotation driving device for rotating said drum around said rotary shaft;
- a fixing member detachably provided in an arbitrary one of said intermittently formed recess parts of said drum to be movable in the circumferential direction of said drum for fixing said recording material onto said outer peripheral surface of said drum; and
- a drawing unit for drawing the image on said recording material fixed onto said outer peripheral surface of said drum,
- said fixing member including:
- a main body member having one side part and an other side part, the one side part for pressing one end of said recording material against said outer peripheral surface of said drum, and
- an engaging member provided to project on the side of a lower surface of said main body member and engaged with the arbitrary one of said intermittently formed recess parts of said drum,
- said drawing apparatus further comprising:
- a fixing member driving device for operating said engaging member of said fixing member to fix said fixing member to said drum or release said fixing member from said drum while holding said fixing member in a state where said engaging member of said fixing member is released from said one of said intermittent recess parts of said drum, wherein
- said engaging member of said fixing member has a press portion and a lock portion, and said lock portion is insertable in one of said recess parts of said drum when pressed by said press portion and locked in said recess part when released from said press portion.

11. The drawing apparatus according to claim 10, wherein
- said fixing member driving device comprises a driving member for pressing said press portion of said engaging member of the fixing member and a driving mechanism for moving said driving member toward said press portion of said engaging member;
- said driving member driving mechanism comprises a moving member which together with said driving member, moves in a predetermined direction, and
- said fixing member driving device further comprises a holding member for holding or releasing said main body member of said fixing member as said moving member moves.

12. The drawing apparatus according to claim 11, wherein a weight is provided in said other side part of said main body member.

13. The drawing apparatus according to claim 12, wherein
- said fixing member further includes urging means for urging the other side part of said main body member in the direction apart from said outer peripheral surface of said drum;

said urging means comprises a spring provided between a lower surface of said other side part of said main body member and the outer peripheral surface of said drum, and said weight is a metal provided in said spring.

14. The drawing apparatus according to claim 11, wherein said fixing member further includes urging means for urging the other side part of said main body member in the direction apart from said outer peripheral surface of said drum; and said urging means comprises a spring provided between a lower surface of said other side part of said main body member and the outer peripheral surface of said drum.

15. The drawing apparatus according to claim 11, wherein said engaging member is a rotating member provided so as to be rotatable in said main body member and fixed in one of said recess parts of said drum as said drum rotates.

16. The drawing apparatus according to claim 15, wherein said fixing member further comprises a sliding member provided in said main body member so as to be slidable in a predetermined direction for rotating said rotating member as said sliding member slides, and wherein said driving member engages with said sliding member in said fixing member.

* * * * *